United States Patent [19]

Ozawa et al.

[11] Patent Number: 5,200,893
[45] Date of Patent: Apr. 6, 1993

[54] COMPUTER AIDED TEXT GENERATION METHOD AND SYSTEM

[75] Inventors: Kuniaki Ozawa, Kawasaki; Hiroshi Kinukawa, Machida; Kazuaki Maeda, Kawasaki, all of Japan

[73] Assignees: Hitachi, Ltd., Tokyo; Hitachi Microcomputer Engineering Ltd., Kodaira, both of Japan

[21] Appl. No.: 484,888

[22] Filed: Feb. 26, 1990

[30] Foreign Application Priority Data

Feb. 27, 1989 [JP] Japan ................... 1-043016

[51] Int. Cl.⁵ .................. G06F 15/38; G06F 15/00
[52] U.S. Cl. ..................... 364/419; 395/144
[58] Field of Search ............ 364/419; 395/902, 927, 395/934, 144, 145

[56] References Cited

U.S. PATENT DOCUMENTS

| | | | |
|---|---|---|---|
| 4,712,174 | 12/1987 | Minkler, II | 364/200 |
| 4,773,009 | 9/1988 | Kucera et al. | 364/419 |
| 4,841,472 | 6/1989 | Izuhara et al. | 364/419 |
| 4,864,502 | 9/1989 | Kucera et al. | 364/419 |
| 4,887,212 | 12/1989 | Zamora et al. | 364/419 |
| 4,931,935 | 6/1990 | Ohira et al. | 364/419 |
| 4,958,285 | 9/1990 | Tominaga | 364/419 |
| 5,063,534 | 11/1991 | Kishimoto | 364/419 |

FOREIGN PATENT DOCUMENTS 62-284457 12/1987 Japan .

OTHER PUBLICATIONS

"KMS: A Distributed hypermedia system for managing knowledge in organization" by Akscyn et al.; Communication of the ACM; Jul. 1988, vol. 31, pp. 820-835.
"VALSPEAK EXE"; Program; Oct. 27, 1986.
Fukushima et al "One Approach to On-Line Translation" on Natural Language Processing, 41-5, Jan. 26, 1984 in Information Processing Society of Japan, pp. 1-8.
JP-A-62-284459.

Primary Examiner—Roy N. Envall, Jr.
Assistant Examiner—Xuong Chung
Attorney, Agent, or Firm—Antonelli, Terry, Stout & Kraus

[57] ABSTRACT

A computer aided text generation system and method provides functions of aiding a logical outline structure of a text, aiding the text generation using a conventional expression, aiding the text generation without using conventional expression, aiding the refinement of the generated text and aiding the collection of illustrative sentences. The present system permits generation of a finished text of high quality.

53 Claims, 31 Drawing Sheets

FIG. 4

| ITEM NUMBERS | | | POINTER |
|---|---|---|---|
| 1 | LETTER | CONTINUATION | HEAD ADDRESS OF TABLE 52 |
| 2 | REPORT | CONTINUATION | HEAD ADDRESS OF TABLE 52i |
| 3 | MANUAL | CONTINUATION | HEAD ADDRESS OF TABLE 52j |
| 4 | PAPER | CONTINUATION | HEAD ADDRESS OF TABLE 52k |

| ITEM NUMBERS | | | POINTER |
|---|---|---|---|
| 1 | THANKS | CONTINUATION | HEAD ADDRESS OF TABLE 53 |
| 2 | REQUEST | CONTINUATION | HEAD ADDRESS OF TABLE 53i |
| 3 | CONSENT | CONTINUATION | HEAD ADDRESS OF TABLE 53j |
| 4 | DECLINING | CONTINUATION | HEAD ADDRESS OF TABLE 53k |
| 5 | | | |

| ITEM NUMBERS | 56 | 57 | POINTER |
|---|---|---|---|
| 1 | THANKS FOR HOSPITALITY | END NODE | ITEM NUMBER 2 ADDRESS OF TABLE 54 |
| 2 | THANKS FOR PRESENT | CONTINUATION | HEAD ADDRESS OF TABLE |
| 3 | RETURN FOR INVITATION | END NODE | ITEM NUMBER 5 ADDRESS OF TABLE 54 |
| 4 | THANKS FOR MATERIAL SENDING & REMITTANCE | END NODE | ITEM OF TABLE 54 |

| ITEM NUMBERS \ NUANCES | STYLE IS NEUTRAL ||||| |
|---|---|---|---|---|---|---|
| | SHORTER TEXT || MEDIUM TEXT || LONGER TEXT ||
| | NORMAL EMOTION | SEVERE EMOTION | NORMAL EMOTION | SEVERE EMOTION | NORMAL EMOTION | |
| 1 | DEVELOPMENT 1 | DEVELOPMENT 2 | DEVELOPMENT 3 | DEVELOPMENT 4 | DEVELOPMENT 5 | |
| 2 | DEVELOPMENT 1 | DEVELOPMENT 2 | DEVELOPMENT 9 | DEVELOPMENT 10 | DEVELOPMENT 3 | |
| 3 | --- | --- | --- | --- | --- | |
| 4 | --- | --- | --- | --- | --- | |

FIG. 8

SCENE: MEETING/DEBATE  TOPIC: PERFORMANCE

| ITEM NUMBERS | CONVENTIONAL EXPRESSIONS | STYLE | LENGTH OF WRITING | EXPRESSION OF EMOTION | CONSISTENCY INFORMATION |
|---|---|---|---|---|---|
| 1 | THE MEETING WAS BOTH INFORMATIVE AND ENJOYABLE. | N | SMALLER | MEDIUM | 1 |
| 2 | IT WAS VERY GOOD OF YOU TO INVITE ME TO THE MAGNIFICENT MEETING. | F | SMALLER | MEDIUM | 1 |
| 3 | YOU DON'T KNOW HOW MUCH I ENJOYED THAT EXCITING MEETING. | I | SMALLER | MEDIUM | 1 |
| 4 | I HAVE NEVER ATTENDED SUCH AN EXQUISITE MEETING CHAIRED BY AN IMPECCABLE PERSON LIKE YOU. | N | SMALLER | LARGER | 1 |
| 5 | FROM THE DISCUSSIONS WITH YOU I REALLY UNDERSTOOD THAT WE HAVE SUCCEEDED IN CONSOLIDATING OUR BUSINESS COOPERATION IN THIS FIELD. | F | MEDIUM | MEDIUM | 2 |
| 6 | THE DISCUSSIONS WITH YOU WERE SURE TO HELP ME REALIZE THAT OUR BUSINESS ACTIVITIES IN YOUR COUNTRY WOULD EXPAND FURTHER. | N | MEDIUM | MEDIUM | 2 |
| 7 | THE MOST VALUABLE THING THAT I GOT PERSONALLY DURING THE MEETING WAS YOUR ENTHUSIASM FOR ESTABLISHING NEW BUSINESS. | N | LARGER | MEDIUM | 3 |

FIG. 9

| ITEM NUMBERS | THANKS FOR HOSPITALITY | SECOND PARAGRAPH: IMPRESSIVE MATTERS | |
|---|---|---|---|
| | | GENERAL-PURPOSE CONVENTIONAL EXPRESSIONS | COMMENTS ON BLANKS |
| 1. | | ☐ WAS THE HIGHLIGHT OF MY TRIP. | · DESCRIBE MOST IMPRESSIVE MATTER |
| 2. | | I WAS MOST IMPRESSED WITH ☐ DURING MY STAY IN YOUR COUNTRY. | · DESIRABLE TO GENERATE NEW TEXT CONCERNING THE IMPRESSION |
| 3. | | ☐ WILL LIVE IN MY MEMORY FOR EVER AS ONE OF THE HIGH SPOTS OF MY RECENT TRIP TO YOUR COUNTRY. | |

| ITEM NUMBERS (72) | STANDARD SENTENCE STRUCTURE EXPRESSIONS (73) | KEYWORDS (74) | ENGLISH SENTENCE STRUCTURES (75) |
|---|---|---|---|
| 30 | ZUZUSHIKUMO --- SURU | ZUZUSHIKUMO | HAVE THE CHEEK TO V |
| 31 | ~SURUNOWA --- SURUYOUNA MONODA | YOUNA, MONO | MIGHT AS WELL V --- AS V ~ |
| 32 | ~SURUYORIWA --- SURUHOUGA YOI | YORI, HOU, YOI | WOULD SOONER V --- THAN V ~ |

| (77) | PARAPHRASED EXPRESSIONS (78) | KEYWORDS (79) | STANDARD SYNTAX NUMBERS (80) |
|---|---|---|---|
| 1 | ATSUKAMASHIKUMO ~ SURU | ATSUKAMASHIKUMO | 30 |
| 2 | ~SURUNOWA --- SURUNI-HITOSHII | HITOSHII | 31 |
| 3 | ~SURUYORIWA --- SURUHOUGAMASHIDA | YORI, HOU, MASHI | 31, 32 |
| 4 | ~SURUYORIWA --- SHITAI | YORI, SHITAI | 32 |

| HEADWORDS | ARTICLE TYPES | USAGE OF ARTICLES | ILLUSTRATIVE SENTENCE NUMBERS |
|---|---|---|---|
| CHICKEN | 1 | • A CHICKEN AS A LIVING BEING IS A COUNTABLE NOUN<br>• FOWL AS A FOOD IS AN UNCOUNTABLE NOUN | 608 |
| INFORMATION | 6 | • NO PLURAL FORMS (UNCOUNTABLE NOUN)<br>• "HITOTSUNO JOUHOU" SHOULD BE REPRESENTED BY "A PIECE OF INFORMATION | 38 |
| POLICE | 5 | • ITS FORM IS SINGULAR BUT SHOULD BE HANDLED ALWAYS AS BEING PLURAL ("HITORINO KEIKAN" SHOULD BE "A POLICEMAN")<br>• "THE" IS OFTEN GIVEN | 96<br>41 |

FIG. 13

| USAGE OF NOUNS | ARTICLE TYPES | 1 | 2 | 3 | 4 | 5 | 6 | 7 |
|---|---|---|---|---|---|---|---|---|
| COUNTABLE | SINGULAR | ○ | ○ | ○ | X | X | X | ○ |
| COUNTABLE | PLURAL | ○ | ○ | X | ○ | ○ | X | X |
| UNCOUNTABLE | | ○ | X | ○ | ○ | X | ○ | X |

F I G. 14

| 18 | ACCEPT | | |
|---|---|---|---|
| ITEM NUMBERS | VERB TYPES | MEANINGS | ILLUSTRATIVE SENTENCE NUMBERS |
| 1 | ACCEPT (VERB INTRANSITIVE) | UKAIRERU | 10 |
| 2 | ACCEPT + O(NOUN; WHAT-CLAUSE) | (TEIKYOUSARETAMONOWO UKEIRERU) | 1990 |
| 3 | ACCEPT + O1(NOUN) + AS + O2(NOUN; ADJECTIVE; PARTICLE) | O1 WO O2 TOSHITE MITOMERU | 16 17 18 |
| 4 | ACCEPT + THAT-CLAUSE | (---KOTO) WO MITOMERU | 22 |
| 5 | ACCEPT + O1(NOUN) + INTO/IN/ FROM + O2(NOUN) | "INTO/IN": O1 WO O2 NO NAKA NI UKEIRERU "FROM: O2 KARA O1 WO UKETO RU | 25 27 |
| 6 | ACCEPT + O(NOUN) + TO-INFINITIVE | "O" GA --- SURUKOTOWO RYOU KAISURU | 28 |
| 7 | ACCEPT + O(NOUN) + AS-CLAUSE | "O" WO --- NO TOORINI UKEIRE RU | 29 |
| | IDIOMATIC PHRASES | MEANINGS | ILLUSTRATIVE SENTENCE NUMBERS |
| 8 | ACCEPT ANY COST TO V | BAN-NANWO HAISHITE --- SURU | 32 |
| 9 | ACCEPT --- AT ITS FACE VALUE | ---WO GAKUMEN DOORINI UKETORU | 33 |
| 10 | ACCEPT --- FOR IT | ---WO SONOMAMA UKEIRERU | 34 |
| 11 | ACCEPT --- ON CONDITION THAT. ~ | ~ NO JOUKENO MONONI --- UKEIRERU | 41 |

| MODIFIERS |
|---|
| BACK, BLINDLY, CHEERFULLY, CONTENTEDLY, --- |

| USAGES |
|---|
| ACCEPT OF: THE USAGE OF THIS VERB INTRANSITIVE IS NOT USED TODAY |

FIG. 15

| 174 | | 177 CONFIDENCE 170 178 | | 175 | 176 |
|---|---|---|---|---|---|
| | | NOUN TYPES | MEANINGS | | ILLUSTRATIVE SENTENCE NUMBERS |
| 171 | 1 | CONFIDENCE+THAT-CLAUSE | ⟨…TOIU⟩ SHIN-YOU; KAKUSHIN | | |
| | 2 | CONFIDENCE + TO DO | ⟨…SURU⟩ DAITANSA | | |
| | | IDIOMATIC PHRASES | MEANINGS | | ILLUSTRATIVE SENTENCE NUMBERS |
| 172 | 1 | IN CONFIDENCE | NAISHODE | | |
| | 2 | IN A PERSON'S CONFIDENCE | HITONI SHINNIN SARETE | | |
| | | COLLOCATIONS | MEANINGS | | ILLUSTRATIVE SENTENCE NUMBERS |
| 173 | 1 | V + CONFIDENCE | "CONFIDENCE" WO MOKUTEKIGOTO SURU DOUSHI | | |
| | | 1 ABUSE ~ | SHINRAIWO AKUYOU SURU | | |
| | | 2 BETRAY ~ | SHINRAIWO URAGIRU | | |
| | | 3 CREATE ~ | JISHINWO MOTASERU | | |
| | | ⋮ | ⋮ | | |
| | 2 | (ADZ. OR N)+CONFIDENCE | MODIFIERS FOR "CONFIDENCE" | | |
| | | 1 ABSOLUTE ~ | ZETTAITEKINA SHIN-YOU | | |
| | | 2 COMPLETE ~ | KANZENNA SHIN-YOU | | |
| | | 3 ENTIRE ~ | ZENMENTEKINA SHIN-NIN | | |
| | | ⋮ | | | |
| | 3 | CONFIDENCE + P | "CONFIDENCE" NO ATONIKURU ZENCHISHI | | |
| | | 1 ~ BETWEEN --- | --- NO AIDANO SHINRAI | | |
| | | 2 ~ IN --- | --- NI TAISURU JISHIN, SHINRAI | | |
| | 4 | P + CONFIDENCE | "CONFIDENCE" NO MAENIKURU ZENCHISHI | | |
| | | 1 IN THE ~ THAT --- | --- TO SHINJITE | | |
| | | 2 WITH ~ | KAKUSHINWO MOTTE | | |

FIG. 16

| HEADWORDS | PARTS OF SPEECH | PRECEDING WORD | FOLLOWING WORD | CONTENTS (USAGE OF WORDS DEPENDING ON SENTENCE MEANINGS) |
|---|---|---|---|---|
| ABILITY | N | | OF | WRITTEN AS FOLLOWS DEPENDING ON A WORD SUBSEQUENT TO "OF". <br> ① OF DOING → TO DO <br> ② OF N → IN N |
| ⋮ | | | | |
| ACCEPT | V | | TO DO <br> DOING | ACCEPT ~ → AGREE TO DO ("ACCEPT" HAS NO SUCH VERB TYPES) |
| ⋮ | | | | |
| ESPECIALLY | Adv | PERIOD | COMMA | ESPECIALLY → IN PARTICULAR OR MOVED NEAR A MODIFIER IN SENTENCE ("ESPECIALLY" HAS NO INDEPENDENT USAGE OF "TOKUNI") |
| ⋮ | | | | |
| TYPEWRITER | N | BY | | ① WHEN "TAIPU DE (KAKU)" IS MEANT, "ON A/THE TYPEWRITER" SHOULD BE USED <br> ② WHEN "TYPE NO SOBADE" IS MEANT, "BY A/THE TYPEWRITER" SHOULD BE USED |
| ⋮ | | | | |
| WIFE | N | YOUR | | IF YOU ADD IN A LETTER THE NAME OF THE WIFE OF A PERSON WHOSE WIFE YOU ARE ACQUAINTED WITH, INTIMACY WILL INCREASE; FOR EXAMPLE |
| ⋮ | | | | |
| WOULD | Aux | | YOU | IF THE CONTENTS OF A LETTER CONCERN A REQUEST EVEN IF IT TAKES THE FORM OF AN INTERROGATIVE SENTENCE, A PERIOD (.) SHOULD BE USED IN PLACE OF A QUESTION MARK |
| ⋮ | | | | |

FIG. 17

| HEADING | FULL SPELLINGS |
|---|---|
| ALA. | ALABAMA |
| APT. | APARTMENT |
| ARIZ. | ARIZONA |
| ARK. | ARKANSAS |
| AVE. | AVENUE |
| BLDG. | BUILDING |
| BLVD. | BOULEVARD |

| ILLUSTRATIVE SENTENCE NUMBERS | ILLUSTRATIVE SENTENCES | DICTIONARY NUMBERS | ITEM NUMBERS |
|---|---|---|---|
| ⋮ | | | |
| 1988 | WE TAKE HEALTH FOR GRANTED UNTIL ILLNESS INTERVENES. | 8 | 20 |
| 1989 | IT SHOULD COME AS NO SURPRISE TO ANY MEMBER THAT PUBLISHING IS ONE OF THE COMPUTER SOCIETY'S MAJOR SERVICES. | 2<br>5<br>8<br>8 | 2<br>26<br>1<br>21 |
| 1990 | HE ACCEPTED HIS LOT. | 18 | 2 |

| NUM-BERS | SCENE: MEETING/DEBATE | TOPIC ITEM: PERFORMANCE | |
|---|---|---|---|
| | | PARAPHRASED CONVENTIONAL EXPRESSIONS | ALTERNATIVE EXPRESSIONS TO CONVENTIONAL EXPRESSIONS |
| | | THE MEETING | USER IS REQUESTED TO ENTER SPECIFIC MEETING NAME |
| 1 | | INFORMATIVE AND ENJOYABLE | ① MEMORABLE AND FRUITFUL |
| | | WAS BOTH INFORMATIVE AND ENJOYABLE | ① WAS OF GREAT VALUE TO ME<br>② INSPIRED ME WITH STRONG INCENTIVE IN MY WORK. |
| 2 | | VERY GOOD OF YOU TO INVITE ME TO | ① INDEED A GREAT PLEASURE TO HAVE AN OPPORTUNITY TO PARTICIPATE IN |

FIG. 33

DESIGNATION OF USER'S INTENTION

A. STYLE

1. FORMAL

2. NEUTRAL

3. INFORMAL

B. TEXT LENGTH (DETAILEDNESS)

1. SMALLER (OUT OF COURTESY)

2. MEDIUM (REFLECTING INTIMACY AND SINCERITY)

C. EMPHASIS DEGREE OF WRITER'S EMOTION

1. NEUTRAL (MEDIUM)

2. LARGER EXPRESSION OF WRITER'S EMOTION

| ITEMS | ENTRY COLUMN |
|---|---|

1. ADDRESSEE NAME : [FIRST NAME] [MIDDLE NAME] [FAMILY NAME]

2. TERM OF RESPECT FOR ADDRESSEE : [MR.] [MRS.] [MS.] [DR.] [OTHERS]

3. ADDRESSEE'S POST NAME :

4. ADDRESSEE'S FIRM NAME :

5. ADDRESSEE'S ADDRESS : [ADDRESS] [ZIP] [NATION'S NAME]

6. DATE : [YEAR] [MONTH] [DAY]

7. ADDRESSING THE PARTNER : [FAMILY NAME] [FIRST NAME] [OTHERS]

8. COMPLIMENTARY CLOSE : [GENERAL] (YOURS SINCERELY)

[FORMAL]

- YOURS FAITHFULLY (MOST FORMAL)
- CORDIALLY YOURS (INTIMATELY)
- RESPECTFULLY YOURS (TO ONE'S SUPERIOR)

[UNKNOWN PERSON] (YOURS TRULY)

[OTHERS]

9. LAYOUT : [FULL BLOCK] [SEMI-BLOCK]

[BLOCK]

DESIGNATION OF METHOD OF
COLLECTING ILLUSTRATIVE SENTENCES

1. COLLECTION OF ILLUSTRATIVE SENTENCES
   CONCERNING COLLOCATIONS

CONCURRENCE OF EACH OF VERB, NOUN, ADJECTIVE WITH PREPOSITION, INFINITIVE, THAT-CLAUSE OR GERUND IS ANALYZED AND ONLY SENTENCES CONTAINING TYPES WHICH ARE NOT CONTAINED IN COLLOCATION DICTIONARY ARE COLLECTED.

2. COLLECTION OF ILLUSTRATIVE SENTENCES
   CONCERNING FUNCTION WORDS

SENTENCES ARE COLLECTED WHERE A PERCENTAGE OF THE NUMBER OF FUNCTION WORDS SUCH AS PRONOUNS, PREPOSITIONS, etc. IN THE TOTAL NUMBER OF WORDS OF ONE SENTENCE IS LARGER THAN A GIVEN VALUE. IN MANY CASES, SUCH SENTENCES ARE AVAILABLE AS "USEFUL EXPRESSIONS".

3. COLLECTION OF ILLUSTRATIVE SENTENCES
   CONCERNING DESIGNATED WORDS

DESIGNATED WORDS OR CONCURRENCE OF DESIGNATED WORDS ARE ANALYZED AND SENTENCES WHICH CONTAIN THESE DESIGNATED WORDS ARE COLLECTED.

DESIGNATED WORDS ARE INPUT:

FIG. 37

DESIGNATION OF FUNCTION WORDS ( ADDITION   DELETION )

PRONOUNS        ANY . IT . NO . SUCH . THAT

PREPOSITIONS    AS . AT . BETWEEN . BY . FROM TO

CONJUNCTIONS    AND . BUT . TILL .

ADVERBS         LESS . MORE .

AUXILIARY VERBS CAN . MAY . MUST . NEED

CONDITIONS OF ILLUSTRATIVE
SENTENCE COLLECTION

SENTENCES WHERE A PERCENTAGE OF THE NUMBER OF FUNCTION WORDS IN ONE SENTENCE IS 30 % OR MORE ARE COLLECTED AUTOMATICALLY FROM TEXT.

FIG. 38

COLLECTED ILLUSTRATIVE SENTENCES

1. <u>IT</u> SHOULD COME <u>AS</u> <u>NO</u> SURPRISE <u>TO</u> <u>ANY</u> MEMBER <u>THAT</u> PUBLISHING IS ONE OF THE COMPUTER SOCIETY'S MAJOR SERVICES

FUNCTION-WORD PERCENTAGE $= \frac{6}{19} = 31.6\%$ (UNDERLINE INDICATES FUNCTION WORDS)

COMPUTER AIDED TEXT GENERATION METHOD AND SYSTEM

BACKGROUND OF THE INVENTION

The present invention relates to a computer aided text generation method and system. The present invention also relates to machine translation and word processors.

The following prior art has been proposed for computer aided text generation. One of the conventional techniques is described in "One Approach to On-Line Translation", IPSG (*Information Processing Society of Japan*) SIG (*Special Interest Group*) *REPORTS ON NATURAL LANGUAGE PROCESSING*, 41-5 (Jan. 26, 1984), pp. 1-8. This refers to an application of a machine translation system and handles foreign language letters, for example, directed to a visit. The features of that approach are to translate a natural source language to a target language via a source language expression based on the way of thinking in the target language.

Another conventional technique, Japanese Patent Laid-Open JP-A-62-284459, relates to a device which receives data on the purpose of a text to be generated and displays items to be incorporated into the text in accordance with the received data. The features of the device are to store data on items necessary for text generation, to analyze the input purpose of the text generation, and to retrieve and display data on the items on the basis of the result of the analysis. In connection with this conventional technique, the presentation of a text model corresponding to the purpose of the text is disclosed in JP-A-62-284457. However, it only discloses the compliments of the season in letters.

SUMMARY OF THE INVENTION

It is an object of the present invention to provide a method of aiding the generation of a desired text at simple directives.

It is another object of the present invention to provide a method of aiding the refinement of a generated text to generate a finished text of higher quality.

It is still another object of the present invention to provide a method of effectively collecting illustrative sentences useful for text generation.

Other objects of the present invention will be obvious from the description of the present invention when taken in conjunction with the accompanying drawings.

The present invention derives from the contemplation of the following conventional techniques.

The above-mentioned first conventional technique handles one sentence, and cannot be said to aid text generation. In the second conventional technique, the display of data on the item is advantageous, but the text generation itself depends on the user. The display of a text model is locally useful if it is a very conventional expression, but the generation of the whole text also depends on the user. Namely, the conventional technique aids only part of text generation and is not human friendly for the user.

In order to achieve the above objects, the present invention takes the following measures. In order for a writer to generate a desired text, it is necessary to aid the reflection of the writer's intention on a text to be generated. To this end, the present invention aids the text generation as follows:

(1) Aid to the logical outline structure,
(2) Aid to the selection of a conventional expression and aid to the text generation using a conventional expression,
(3) Aid to the generation of a text which is not registered as a conventional expression,
(4) Aid to the refinement of generated texts, and
(5) Aid to the collection of illustrative sentences.

These aiding methods will now be described briefly below:

(1) Aid to the logical outline structure

When a text is generated, it is important whether the logical outline structure of the text is good or not. The intention and emphasis of the writer will appear in the logical outline structure of the text. A text in which the intention and emphasis of the writer are not clear is unintelligible for a person who reads it.

Thus, in the present invention, the kind of a text and the intention of the writer to a text to be generated are set. A logical outline structure is determined in which the items (scenes and topics) constituting part of the text are elements. The items can be said to express the contents of the text. As just described above, the logical outline structure is settable in which the intention and emphasizes of the writer to the text to be described are reflected.

(2) Selection of a conventional expression and computer aided text generation using a conventional expression In order to generate a text efficiently or in a short time, it is desirable to be able to generate a text using a conventional expression. In order to satisfy this desire to the utmost in the present invention, many conventional expressions are prepared for each of the components of the logical outline structure of a text. A conventional expression is a sentence or a sentence pattern used customarily or usually. If a logical outline structure is designated, proper conventional expressions following that logical outline structure are generated automatically. One of the generated expressions is selected and corrected to generate a text. Proper conventional expressions are successively generated automatically in accordance with a logical outline structure designated at simple directions.

In the present invention, a style, the emphasis degree of writer's emotion and the length of a text are set as the attributes to a conventional expression in order to reflect the writer's intention appropriately in the text.

Furthermore, in the present invention, a changeable portion of a conventional expression and a portion of the conventional expression in which words and phrases may be set optionally are shown clearly to suggest to the operator a change of that expression portion and the setting of new words and phrases.

(3) Computer aided generation of a text which is not registered as a conventional expression A text cannot necessarily be generated satisfactorily using conventional expressions alone. To avoid such situation, it is arranged that the writer is capable of generating any text in the present invention. The writer cannot only generate texts freely as he or she does on a word processor. The generation of texts of fields and kinds in which the writer is unaccustomed to the generation of the texts, using only functions, for example, of a general word processor is not easy. In the present invention, the generation of any text is aided. More specifically, the writer is guided in syntax and usage.

The guidance to syntax is performed by referring to a syntax dictionary where various expressions are indicated for the same text contents to provide plentiful expressing processes for the writer.

The guidance to usage teaches the writer the usage of words, collocations, ideomatic phrases, etc., or a part of speech which are the components of a text. In English, it includes the expression of tense, narration and comparison and the usage of articles. In Japanese, it includes peripharastic expressions, colloquial/literary expressions, and the usage of honorific words.

(4) Aid to the refinement of a generated text

The system according to the present invention has a function of checking a text in units of word as the basis of text refinement. The function is spell checking in English while it is to check the usage of a homonym of a kanji or Chinese character, the proper use of a kanji character and hiragana or a Japanese cursive syllabry, etc., in Japanese.

In the present invention, it is checked whether the words and sentences used coincide with the context of a text or are appropriate as a natural language. To this end, provision is made of rules of refinement in which words, idioms, sentences or the like which differ in usage depending on situation correspond to various sentence meanings, and rules of refinement in which mistakable expressions are stored. It is checked whether the usage of words, idioms, sentences, etc., in the generated sentence is proper, by referring to these rules of refinement.

Furthermore, the present invention realizes the aid to generation of a conventional expression portion the format of which is fixed to some extent and a process for aiding the refinement of that expression portion. A text is generated automatically by referring to a file in which data on the formats of and processes for describing conventional expression portions is stored beforehand. For words and phrases which cannot be generated automatically, the generated text is refined by the aid of this system.

(5) Aid to the collection of illustrative sentences

The realization of the items (1)-(4) can be said to suffice for the aid to text generation. Furthermore, the present invention realizes the aid to collection of illustrative sentences. The function of collecting illustrative sentences is indirect and includes either a background operation or an off-line operation while the functions (1)-(4) act directly on the generation of a text.

According to the present invention, illustrative sentences can be collected from sentences generated by the writer, or from general prints or books.

In the present invention, the respective aiding functions are related remotely to each other because both the consistent use of the inventive text generation system and the selective use of required aiding functions are possible, so that the human-friendly operation of the system is enhanced. Furthermore, the same kind of aiding function is available in a recursive manner.

Operation

In the present invention, the kind of a text to be generated and the writer's intention (nuance) to the text are set and the logical outline structure of the text which has, as its components, items (scenes, topics) constituting part of the text is determined on the basis of that setting. Therefore, a text where the writer's intention and emphasis are reflected can be easily generated.

The logical outline structure is indicated in a diagram where many scenes, topics and the relation among them are displayed in a graphical manner, so that the writer can easily select a logical outline structure satisfying his or her intention.

When a logical outline structure is designated, proper conventional expressions following the structure are generated automatically. One of the expressions is selected and corrected in response to simple directions for the generated conventional expressions. Proper conventional expressions are successively generated automatically in accordance with the logical outline structure designated at simple directions. Furthermore, in order to reflect the writer's intention properly, it is arranged that a style, an emphasis degree of writer's emotion and a text length can be set as the attributes of the text to be generated. Thus, the writer can easily generate a desired, especially nuanced text at simple directions. Since a conventional expression can be amended when its wording is required to be changed, the option of text generation is high.

As just described above, since attributes such as the style and length of a text, etc., representing the degree of detailedness of its description are settable, a conventional expression reflecting the writer's intention thereon can be easily selected.

A syntax dictionary where various expressions are provided corresponding to the same contents and the guidance to a syntax is provided, which presents plentiful expressions to the writer who refers to the dictionary, so that the writer is aided satisfactorily in the generation of a text appropriate for a natural language. When a desired syntax is retrieved from the dictionary, its precision rate in retrieval is improved.

The generation of a text of appropriate expressions can be aided by the guidance to the usage which tells the writer the usage of words, collocations, idioms, etc., which are the components of the text or parts of speech.

The generated text can be further refined by checking the appropriateness of the words, phrases and sentences in the text to the context of the text and as a natural language. Furthermore, a refined text can be generated in a short time by aiding the generation and refinement of a convention expression portion (auxiliary portion) having a format determined before hand to some degree.

One of the inventive principles of collecting illustrative sentences is as follows. A sentence includes words (more specifically, parts of speech to which the words belong) which support the structure of the sentence grammatically. Such a word is called a function word. In English, pronouns, auxiliary verbs, prepositions, conjunctions, etc., are function words. The percentage of function words included in a sentence is defined as a function-word percentage using the number of words as a unit. Sentences having a function-word percentage larger than a predetermined value (threshold value) are collected as illustrative sentences. In this case, the entire sentence (all the words constituting the sentence) can be not only used as an illustrative sentence, but also a sentence from which only function words are removed and words other than function words are rendered blank can be used for an illustrative sentence. Such selection and the threshold will be designated by the user of the inventive system. The methods of collecting illustrative sentences, using not only function words as a reference but also designated particular words and phrases as a reference, are aided.

The function of aiding the collection of illustrative sentences does not necessarily handle generated sentences alone as an object. Illustrative sentences may be collected from a text, for example a novel or an article, read by an OCR (Optical Character Reader), or a collection of illustrative sentences as a book when occasion demands.

The illustrative sentences thus collected are available as the conventional expressions, as mentioned above, guidance to a syntax, or a syntax for guidance to a usage or illustrative sentences for them.

By realizing the function of collecting illustrative sentences, the system advantageously multiplies dictionaries or rules such as a collection of rules which the computer aided text generation system has. That is, the acquisition of knowledges in the system is realized by the present invention.

The various computer-aided text generation methods according to the present invention are remotely related to each other. Therefore, the respective methods are usable independently and in conformity to the phase of text generation, so that the human-friendly operation of the computer aided text generation system according to the present invention is improved. Furthermore, since friendly operability is very high. For example, while guides to the usage of a particular word are being used, guides to the usage of another word are usable. That is, the present invention is very effective when the best results are to be obtained from pieces of formation.

BRIEF DESCRIPTION OF THE DRAWINGS

FIGS. 4-6 each show an illustrative structure of a text classification table;

FIG. 7 shows an illustrative structure of a logical outline structure index table;

FIG. 8 shows one illustrative structure of file of conventional expressions;

FIG. 9 shows one illustrative structure of a file of illustrative general-purpose conventional expressions;

FIGS. 10 and 11 each show one illustrative structure of a syntax guiding dictionary;

FIGS. 12, 14 and 15 each show one illustrative structure of a usage guiding dictionary;

FIG. 13 illustrates a part of the contents of guidance to the usage;

FIG. 16 shows one illustrative structure of a file of text refinement rules;

FIG. 17 shows one illustrative structure of a collection of rules to generate auxiliary portions;

FIG. 18 shows one illustrative structure of an illustrative sentence registration dictionary;

FIG. 24 shows one illustrative structure of a file of illustrative conventional expressions;

FIG. 33 shows an illustrative display for designation of the user's intention;

FIG. 35 shows one illustrative display for generation of auxiliary portions;

FIGS. 36 and 37 each show one illustrative display for designation of a process for collection of illustrative sentences; and FIG. 38 shows one illustrative display indicative of the results of collection of illustrative sentences.

DESCRIPTION OF THE PREFERRED EMBODIMENTS

Figure 1:
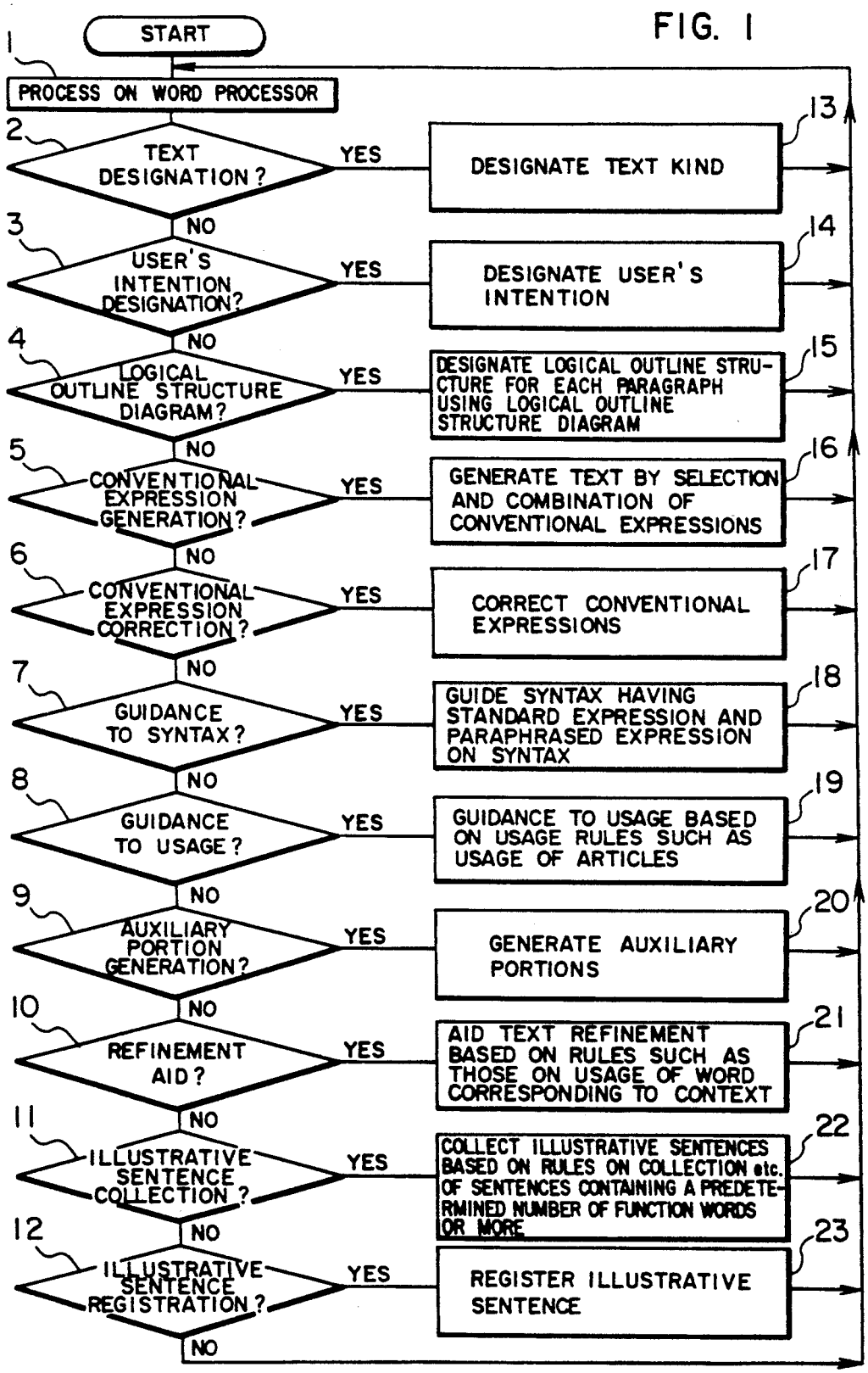
FIG. 1 is a flowchart indicative of the basic operation of a computer aided text generation system according to the present invention.

First, the present invention will be described. In order for a writer to generate a desired text, it is necessary to aid the reflection of the writer's intention on a text to be generated. To this end, the present invention aids the text generation as follows:

(1) Aid to the logical outline structure, (2) Aid to the selection of a conventional expression and aid to the text generation using a conventional expression, (3) Aid to the generation of a text which is not registered as a conventional expression, (4) Aid to the refinement of generated texts, and (5) Aid to the collection of illustrative sentences.

These aiding methods will now be described briefly below:

(1) Aid to the logical outline structure

When a text is generated, it is important whether the logical outline structure of the text is good or not. The intention and emphasis of the writer will appear in the logical outline structure of the text. A text in which the intention and emphasis of the writer are not clear is unintelligible for a person who reads it.

In the computer aided text generation system according to the present invention, a logical outline structure diagram is displayed which has as the components the contents (scenes and topics, etc.,) of a text. A logical outline structure can be easily designated which reflects the intention and emphasis of the writer in accordance with the display.

The logical outline structure diagram graphically shows many scenes, topics and relationship therebetween, so that the writer can easily select a logical outline structure following his or her intention.

(2) Selection of a conventional expression and computer aided text generation using a conventional expression Many conventional expressions are prepared for each of the constituent items of a logical outline structure in the inventive system. A conventional expression means a sentence or a sentence pattern used customarily and usually. In the following description, a conventional phrase or a meaningful phrase can be included in the conventional expressions for handling purposes.

When a logical outline structure is designated, conventional expressions appropriate for a first scene and topic following the logical outline structure are displayed automatically. At simple directions responsive to that display, one of the conventional expressions is selected and corrected into a text. When part of a text is generated in accordance with a scene or a topic, conventional expressions appropriate for the next scene or topic are displayed successively in accordance with the designated logical outline structure. Like this, the writer can easily generate a desired text at simple directions.

By such process, a text is generated which reflects the writer's intention considerably so long as it is a specified text, for example, of an invitation to a meeting. Generally, that alone is, however, not satisfactory. Even if the text concerns an invitation to a meeting, the expression must be changed sometimes. In order to appropriately reflect the writer's intention, it is arranged in the present invention that a style, an emphasis degree of writer's emotion and the length of a sentence can be set as the attributes of the text to be generated. The length of the text represents a degree of detailedness of description. The settability of the attributes of a type, etc., facilitates the selection of a conventional expression which reflects the writer's intention.

(3) Computer aided generation of a text which is not registered as a conventional expression A text cannot necessarily be generated satisfactorily using conventional expressions alone. To avoid such situation, it is arranged in the present invention that the writer is capable of generating any text. The writer cannot only generate texts freely as he or her does on a word processor. The generation of texts having a field and a kind is not easy to which the writer is unaccustomed, using only functions such as, for example, those of a general word processor. In the present invention, the generation of any text is aided. More specifically, the writer is guided in syntax and usage.

The guidance to syntax is performed by referring to a syntax dictionary where various expressions of the same text contents are indicated in corresponding relationship to allow the writer to select an appropriate expressing process.

The guidance to usage teaches the writer the usage of words, collocations, ideomatic phrases, etc., which are the components of a text or parts of speech. In English, it includes the expression of tense, narration and comparison and the usage of articles. In Japanese, it includes peripharastic expressions, colloquial/literary expressions, and the usage of honorific words.

(4) Aid to the refinement of a generated text

The system according to the present invention has a function of checking a text in units of word as the basis of text refinement. The function is spell checking in English while it is to check the usage of a homonym of a kanji or Chinese character, and to properly use a kanji character and hiragana or a Japanese cursive syllabry, etc., in Japanese.

The inventive system has a function of checking whether the words and sentences used conform with the context of the text or are appropriate as a natural language.

These functions are realized as follows. Provision is made of rules of refinement in which words, idioms, sentences, etc., which differ in usage depending on situation correspond to various meanings of sentences, and rules of refinement in which mistakable expressions are stored. It is checked whether the usage of words, idioms, sentences, etc., in the generated sentence is proper, by referring to these rules of refinement. By the realization of the refining function, the writer is able to refine the generated text furthermore.

(5) Aid to the collection of illustrative sentences

The possession of the functions represented by the items (1)–(4) can be said to suffice for the aid to text generation. Furthermore, the inventive system has a function of aiding the collection of illustrative sentences. The function of collecting illustrative sentences is indirect and can be said to be either a background operation or an off-line operation whereas the functions (1)–(4) act directly on the generation of a text.

According to the present invention, illustrative sentences can be collected from sentences generated by the writer, or from general prints or books.

One of the inventive principles of collecting illustrative sentences is as follows. A sentence includes words (more specifically, parts of speech to which the words belong) which support the structure of the sentence grammatically. Such a word is called a function word. In English, pronouns, auxiliary verbs, prepositions, conjunctions, etc., are function words. The percentage of the number of function words included in a sentence is defined as a function-word percentage. Sentences having a function-word percentage larger than a predetermined value (threshold value) are collected as illustrative sentences. In this case, the collected sentence can be used as an illustrative sentence and also the skeleton of the collected sentence including the function words (other words are omitted) can be used as an illustrative sentence. Such selection and the threshold will be designated by the user of the inventive system.

The function of aiding the collection of illustrative sentences does not necessarily handle generated sentences alone. Illustrative sentences may be collected from a text, for example a novel or a paper, read by an OCR (Optical Character Reader), or from a file of illustrative sentences as a book when occasion demands.

The illustrative sentences thus collected are available as the conventional expressions or as the illustrative syntaxes of syntax guidance and usage guidance. They are also available as the illustrative sentences for syntax guidance and usage guidance.

While in the above an illustrative sentence and comments related thereto are described separately for the purpose of easy understanding, an illustrative sentence and comments related thereto can herein be together called a comment.

By realizing the function of collecting illustrative sentences, the system advantageously multiplies dictionaries or a rule such as a collection of rules which the computer aided text generation system has. That is, the acquisition of knowledges in the system is realized by the present invention.

An embodiment of the present invention will now be described more specifically with respect to the drawings.

A computer aided text generation method and system used when the writer will versed in Japanese generates a text in English will be mainly described.

Figure 2:
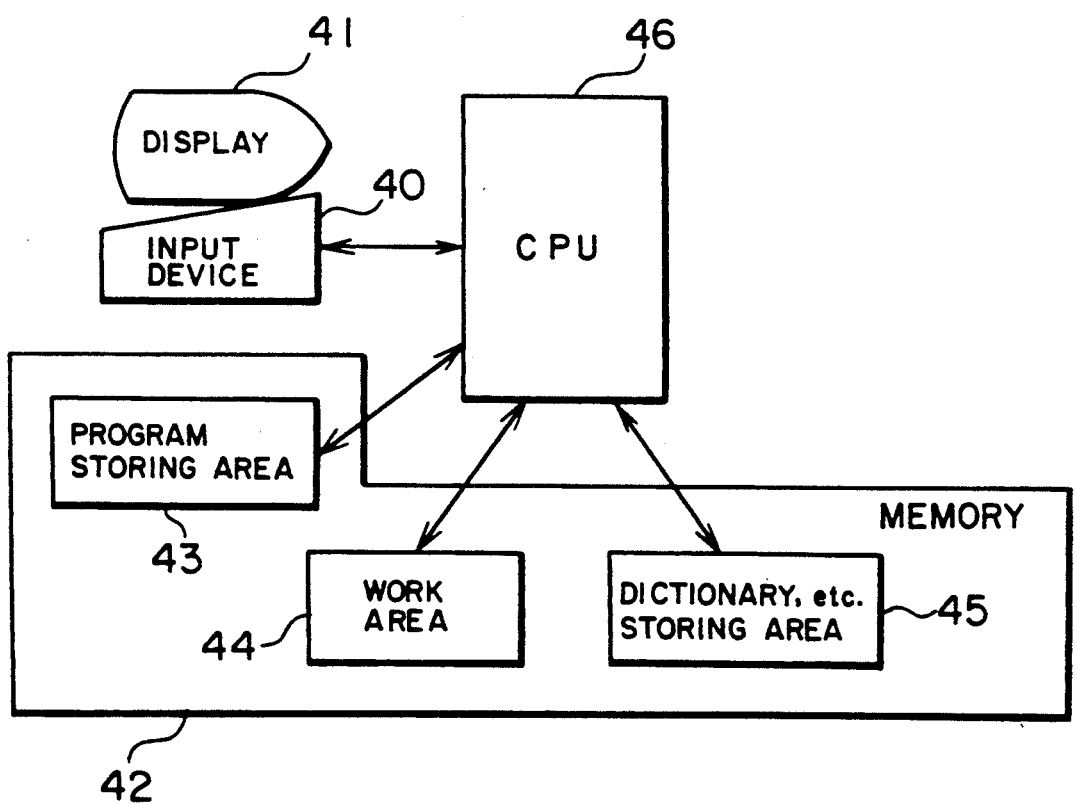
FIG. 2 shows one illustrative structure of the system.

FIG. 2 shows the hardware structure of one embodiment of the present invention. A CPU (Central Processing Unit) 46 executes a program which performs various functions the outline of which is described above. A memory 42 includes an area 43 which stores programs which are executed by the CPU 46, an area 45 which stores dictionaries to be described later, rules or files such as character string texts, and a work area 44 necessary for execution of the programs. The memory 42 should be understood to include a main storage as well as an external storage of the computer. A display 41, for example a display terminal, is used to tell the writer how a text is being generated and to guide the writer in various respects. An input device 40 such as a keyboard or a pointing device (mouse) is used for allowing the writer to input various data.

As will be obvious from the above, the hardware to carry out the present invention may be a general computer system. It may also be a general-purpose computer system, a work station or a microcomputer system. The input and output devices, etc., may be connected dispersively to the computer.

Figure 3:
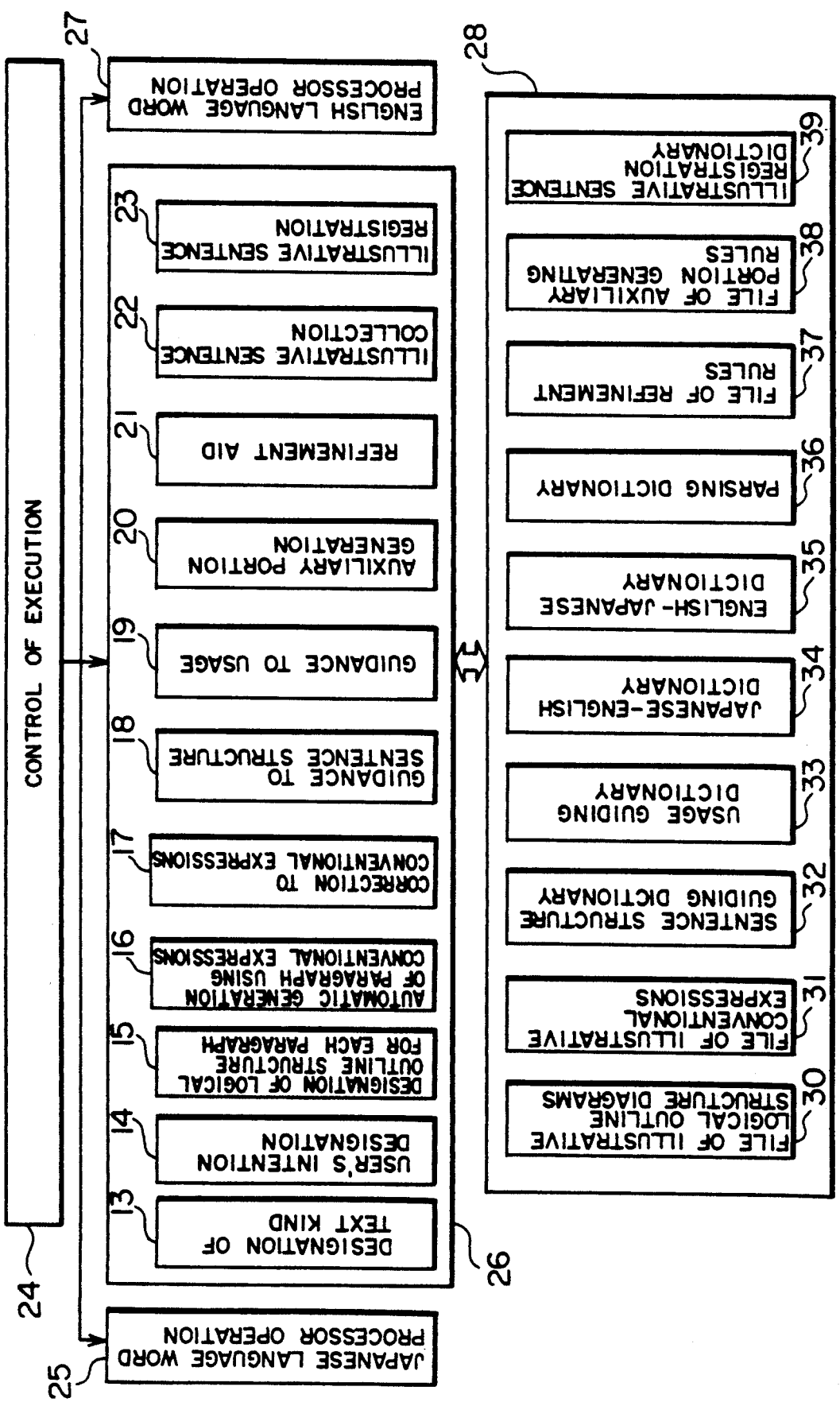
FIG. 3 illustrates the whole functional structure of the system.

FIG. 3 shows the software structure of the inventive text generation system. The software of the present system mainly includes four program groups and files. The four program groups are an execution control program 24, a Japanese word processor program 25, an English word processor 27 and a computer aided text generation program group 26.

The execution control program 24 provides control of the whole system and common control of respective functions to be described below. The control of the whole system concerns selective staring of respective functions to be described below in accordance with input data and/or the progress of processing. The common control concerns processing such as supply of input device 40.

The Japanese and English word processors 25 and 27 are realized in a well-known manner and will be described only when occasion demands.

The respective programs 13-23 included in the computer aided text generation program group 26 will be described when the operation of the present system is described later.

The computer aided text generation program group 26 and file group 28 necessary for execution of the program group will be described below.

The file group 28 is a file of illustrative logical outline structure diagrams 30, a file of illustrative conventional expressions 31, a syntax guiding dictionary 32, a usage guiding dictionary 33, a Japanese-English dictionary 34, an English-Japanese dictionary 35, a parsing dictionary 36, a file of text refinement rules 37, a file of auxiliary portion generating rules 38 and an illustrative sentence registering dictionary 39. Since the Japanese-English dictionary 34 and the English-Japanese dictionary 35 of the file group 28 are those used in the well-known Japanese and English word processor programs 25 and 27, further description thereof will be omitted. The parsing dictionary 36 is one such as, for example, disclosed in Japanese Patent Publication JP-A 58-40684 and further description thereof will be omitted. Each file of the file group is further divided into subfiles or tables when occasion demands.

The file of illustrative logical outline structures 30 includes sentence classification tables 51, 52 and 53, logical outline structure diagram index tables 54 of FIGS. 4-7 and a logical outline diagram file. Those text tables are arranged in a tree-like hierarchical structure such that the text classification table 51 is placed at the highest-ranking position, and accompanied by the text classification tables 52, and 53 of FIGS. 5 and 6, respectively, in this order. That is, there are a plurality of text classification tables each corresponding to table 52 of FIG. 5. There are many text classification tables each corresponding to table 53 of FIG. 6. As will be obvious from the respective structures of the tables of FIGS. 4-6, the structures are the same in any hierarchy.

Each text classification table includes an item number 55, a text classification column 56, a pointer classification columns 57 and a pointer column 58. The items number 55 represents a line position from the head of each text table. The text classification column 56 stores kind of texts collected for each text classification table. The pointer classification column 57 stores "continuation" or "end node". The pointer column 58 stores a pointer to a table to be referred to after the current text classification table referred to at present. The pointer classification column 57 and the pointer column 58 are used in pair as follows. When the pointer classification column 57 represents "continuation", the corresponding pointer column 58 stores a pointer to the head of a text table of a lower hierarchy to be referred to. When the pointer classification column 57 represents "end node", the corresponding pointer column 58 stores a pointer to the corresponding item number in the logical outline structure diagram index table 54.

As shown in FIG. 7, the logical outline structure diagram index table 54 is a two-dimensional table. The diagrams are arranged vertically in order of item numbers while items representing the intention (nuance) of the writer are arranged horizontally. For example, in the leftmost column, the style is neutral and the length of a text is short and the degree of expression of writer's emotion is regular. Each of the columns where vertical item numbers and horizontal items intersect in the two-dimensional table stores a pointer to a file which stores a logical outline structure (FIG. 34) to be described later.

The relationship among the tables will be described more specifically with reference to FIGS. 4-7. The text classification table 51 of FIG. 4 stores the macroscopic classifications of text kinds; for example, "letter" to the item number 1, "report" to the item number 2, and "manual" to the item number 3. The pointer classification column 57 to the item number 1 is "continuation". This indicates that when the text classification is "letter", there is a text type of subclassification. It indicates that the text subclassification is in a text classification table pointed to by a pointer stored in the pointer column 58. Here, it indicates that a text type of the subclassification when the text classification is "letter" is in the text classification table 52 of FIG. 5. The relationship between FIGS. 5 and 6 is similar to that between FIGS. 4 and 5. That is, there is a text type of subclassification in "thanks" to item number 1 in the text classification table 52 of FIG. 5 and the contents of the pointer column 58 to item number 1 point to the text classification table 58 of FIG. 6.

In the text classification table 53 of FIG. 6, the pointer classification column 57 to item number 1 is "end node". As mentioned above, the pointer column 58 to item number 1 represents the item number of the logical outline structure diagram index table 54 of FIG. 7. The pointer column 58, to item number 1, of the text classification table 53 of FIG. 6 points to the vertical item number 2 of table 54 shown in FIG. 7.

The number of hierarchies and the number of item numbers in each hierarchy can vary depending on the classification of a text in the text classification tables of FIGS. 4–6. Therefore, the respective text classification tables are the same in structure, but not necessarily the same in size.

FIGS. 8 and 9 each illustrate one example of a file of conventional expressions 31; that is, there are two kinds of such files. One kind is solely called a file of illustrative conventional expressions and shown in FIG. 8 while the other kind is called a file of general-purpose illustrative conventional expressions, as shown in FIG. 9.

There are a plurality of files of illustrative conventional expressions 59 of FIG. 8 and divided in accordance with the state of the logical outline structure of the text. The state of the logical outline structure of the text is shown in the scene column 60 and the topic column 61 of the file of illustrative conventional expressions 59. The contents of the scene column 60 are "meeting, discussion" and the contents of the topic column 61 are "performance" in the file of illustrative conventional expressions 59 of FIG. 8. In FIG. 8, various conventional expressions corresponding to the scenes and topics are stored in correspondence to item numbers. A style 62, a length 63, an expression of writer's emotion 64 and consistency information 65 are provided in correspondence to each conventional expression. The respective columns of style 62, length 63 and expression of writer's emotion 64 are the nuance shown in the description of FIG. 7 and represents a degree of each conventional expression corresponding to a respective item. The style 62 represents whether the corresponding conventional expression is a formal one or not. The length 63 represents the length of a text for which the corresponding conventional expression is suitable. The expression of writer's emotion column 64 represents the degree of expression of the writer's emotion represented by the corresponding conventional expression. For example, "The meeting was both informative and enjoyable." to item number 1 represents that the style 62 is neutral (N), that the length 63 is small, and that the degree of expression of the writer's emotion is medium. The capital letters "I" and "F" in the style column 62 represent "informal" and "formal", respectively. The consistency information indicates the sequence of selection of conventional expressions by the present system. The system selects a sentence having a nuance close to that designated by the writer from conventional expressions for the same consistency information 65. If this selection ends, the selection of a conventional expression having consistency information of the next order starts. More specifically, one sentence is selected from conventional expressions having the consistency information of "1", then another sentence is selected from conventional expressions having the consistency information of "2" and so on. By provision of such consistency information, a scene and a topic can be represented not in a single sentence but in a plurality of sentences.

A file of general-purpose illustrative conventional expressions 66 of FIG. 9 stores conventional expressions 69 usable for general purposes. Being usable for general purposes is to be usable without dependence on the state of the logical outline structure, namely, the scene and topic, of a text. In order to narrow the range of selection by the writer and to improve the usability, the conventional expression 69 is stored for the text classification 67 and paragraph 68 of the text. Thus, the room for selection of a conventional expression by the writer can be limited to some extent, so that the human friendly operation of the system is improved advantageously.

As shown by rectangles in FIG. 9, a general-purpose conventional expression can have some blank word spaces. The blank spaces give the writer the option of utilization of a conventional expression to thereby increase the range of utilization of a conventional sentence 69. However, since a blank space can bewilder the writer, a comment 70 on the blank space is stored in the file of general-purpose illustrative conventional expressions 66 in correspondence to the conventional expression 69 having a blank space.

The syntax guiding dictionary 32 will now be described, which includes a plurality of files provided for each of the kinds of guiding contents and an index table provided for retrieval of those files. The syntax guiding index table only includes pointers each of which points to each syntax guiding file and further description thereof will be omitted. The structure of a file (solely referred to as guidance to a syntax) corresponding to several kinds of guiding contents will be described.

FIG. 10 shows part of a syntax guiding dictionary 71 where an English syntax correspond to a Japanese standard syntax expression. The dictionary 71 includes an item number 72, a Japanese standard syntax expression 73, a key word 74 attached to the expression 73 and an English syntax 75. For example, in order to obtain the English expression "... have the check to V (Verb)." corresponding to the Japanese standard syntax expression "zuzushikumo ... suru.", using the "zuzushikumo" as the key word, the syntax guiding dictionary 71 is used.

FIG. 11 shows a syntax guiding dictionary 76 which contains paraphrased expressions. The dictionary 76 includes an item number 77, a Japanese paraphrased expression 78, a key word 79 attached to the paraphrased expression 78 and a standard sentence structure number 80 corresponding to the Japanese paraphrased expression 78 and representing the item number 72 of the dictionary 71 shown in FIG. 10. The dictionary 76 is provided in view of the fact that there are various expressions to express the same meaning in Japanese language as well as in any other language. The item number 1 indicates that the value "30" (the item number of the syntax guiding dictionary 71 of FIG. 10) in a standard syntax column 80 corresponds to "atukamashikumo ... suru" (which has the same meaning as "zuzushikumo ... suru") with "atukamashikumo" as the key word. The provision of the dictionary 76 allows a plurality of expressions representing the same meaning to be collected to thereby reduce the capacity of the syntax guiding dictionary 71 indicative of English syntax corresponding to the Japanese standard sentence expression shown in FIG. 10. Furthermore, since the writer can retrieve a desired English syntax using a standard syntax expression or a paraphrased expression in Japan without being aware of the discrimination of these two Japanese expressions, the precision rate in retrieval is very high. The English syntax columns 75 of FIG. 10 each indicate one wording for each item number, but may store a plurality of wordings when occasion demands.

The usage guiding dictionary 33 will now be described. FIG. 12 shows a usage guiding dictionary 81 on the usage of articles in English. The dictionary 81 includes a headword column 82, an article type column 83, an article usage column 84 and an illustrative sentence number column 85. The headword column 82 has nouns or noun equivalents arranged in alphabetical order. A number in the article type 83 represents one of seven kinds of processes for handling nouns or noun equivalents because there can be different manners of usage of articles for the same word.

The article style will be described with respect to FIG. 13. The kinds of usage of nouns or noun equivalents are shown vertically in FIG. 13, which represents whether a noun is a countable or an uncountable one, judging from its meaning, etc., when is used, and whether the noun is a singular or a plural one if it is a countable one. All the combinations of them fall into seven cases except for a case in which the noun is neither countable (neither singular nor plural) nor uncountable (there is no such case in nouns). In FIG. 13, a circlet is attached to cases where countable (in this case, further, singular and plural) and uncountable nouns or noun equivalents are handled.

The article usage column 84 specifically stores, in the form of a string of characters, comments corresponding to a noun stored as the headword. Specifically, the following comments for the headword "information" are stored:

No plural forms (uncountable noun)
When "hitotsuno joho (one information)" is to be said, a "piece of information" should be employed.

The illustrative-sentence number column 85 stores an illustrative-sentence number in the illustrative-sentence registration dictionary 39, the details of which will be described later.

FIG. 14 shows a usage guiding dictionary 86 for the word "accept" as an example of the usage guiding dictionary for collocations. The dictionary 86 mainly includes a dictionary number 95, a verb type (a verb pattern) area 87, an idiomatic phrase area 88, a modifier area 89 and a usage area 90. The verb type area 87 and idiomatic phrase area 88 each include an item number 91, a verb type or idiom 92, a meaning 93 and an illustrative sentence number 94.

The dictionary number 95 is used to identify the usage guiding dictionary 86 for collocations having the headword "accept". Such dictionary numbers are attached to all other dictionaries but omitted for clarity.

When "accept" to the item number 1 of the verb type area 87 is used as an intransitive verb, it means "ukeireru" and indicates that the corresponding illustrative sentence is stored in the item number 10 of the illustrative-sentence registration dictionary 39. The "accept any cost to V (Verb)" to the item number 1 of the idiomatic phrase area 88 means "ban-nan o haishite ... suru" and indicates that the corresponding illustrative sentence is stored in item number 32 of the illustrative sentence registration dictionary 39.

The modifier area 89 stores modifiers used for the headword ("accept" in FIG. 14) of the usage guiding dictionary 86 for collocations. The usage area 90 stores a comment for usage not stored in the verb type area 87 or in the idiomatic phrase area 88.

FIG. 15 shows a usage guiding dictionary 170 for the word "confidence" as an example of the usage guiding dictionary for noun types (noun patterns). The dictionary 170 includes an area 177 indicative of a dictionary number (not shown) and a headword, a noun type area 171, an idiomatic phrase area 172 and a collocation area 173. Each area includes an item number 174, the contents of a noun type or an idiomatic phrase 178, a meaning 175 and an illustrative sentence number 176. The item number 1 for an idiomatic phrase will be described as an example. The idiom "in confidence" means "naisho". The illustrative sentence number using this idiomatic phrase is illustrated in the illustrative sentence number 176. It is to be noted that FIG. 15 omits descriptions in the illustrative sentence number column 176.

FIG. 16 illustrates one example of the file of text refinement rules 37. The file 37 includes a headword 96, the part of speech 97 of the headword or idiom, a preceding word 106 indicative of a word put before the headword or idiom, a following word 107 indicative of a word put after the headword or idiom and a comment 98 concerning the usage of a word or idiom such as the headword or idiom depending on the meaning of the sentence.

For example, the usage "ability of" concerning the word "ability" to item number 1 is wrong and often likely to be used. The correct usage of the word is stored in the content column 98. According to FIG. 16, the comment "the rewriting (1) "of doing"→"to do"; (2)" of N (noun)"→"in N" is made depending on a word after the "of" is stored.

As just described above, the file of text refinement rules 37 mainly collects mistakable usages even if they are directed to the writer's native language or foreign language.

FIG. 17 shows one example of a file of auxiliary portion generating rules 38 which comprises a table 99 where abbreviated forms as headings 100 correspond to their full spelled words 101. Files for the sequence of description or abbreviated description of a date based on a custom for each language, citation of references used for reports, etc., and citation of drawings or other sections and clauses are prepared as other files of auxiliary portion generating rules 38.

FIG. 18 shows a part of an illustrative registration dictionary 39, which includes an illustrative number 102 corresponding to the item number, an illustrative sentence 103, a dictionary number 104 and an item number 105. For example, the illustrative sentence "He accepted his lot." indicates that it is an illustrative sentence to the item number 2 of the dictionary number 18. The dictionary number 18 indicates the usage guiding dictionary 86 for the word "accept" shown in FIG. 14.

The operation of the computer aided text generation system according to the present invention will be described below. When the system is started up, first, it presents a display shown in FIG. 32. This display is called a basic display 110. Various displays appear then to aid text generation, and pictures necessary for the display device 41 appear in overlapped relation by multiwindow control. In such a case, at least part of the basic display 110 appears always scaled down when occasion demands.

The basic display 110 includes functional designation areas 111-130, a text generation area 131, a message output area 132 and an input character display area 133. An arrow 134 denotes a cursor whose position is designated by the mouse. The cursor is used to designate a position picked by the mouse and the position of a character keyed in at the keyboard.

The function designation areas include a "text designation" area 111, a "user's intention designation" area 112, a "logical outline structure diagram" designation area 113, a "conventional-expression sentence generation" designation area 114, a "conventional-expression sentence correction" designation area 115, a "syntax guiding" designation area 116, a "text refinement" designation area 117, an "auxiliary portion generation" designation area 118, an "illustrative sentence collection" designation area 119, an "illustrative sentence registration" designation area 120, and a "help" function designation area 121. The "help" function is used to guide or explain the usage of the present system. It is also used to obtain a list of dictionaries in the present system, data on the structure of the respective dictionaries, and a list of files of various rules. The "help" function is also used to set directly in a predetermined table or in the work area 44 data to be prepared beforehand to execute any particular function without executing the function of generating that data.

Reference numeral 122 only indicates that syntax guiding designation areas are indicated by 123-130 and has no functions as the designation area. The area 123 is used when guidance to the "verb type" is required. The area 124 is used when guidance to the "noun type" is required. The area 125 is used when the guidance to the "adjective type (adjective pattern)" is required. The area 126 is used when the guidance to the "collocation" is required. The area 127 is used when guidance to the "synonym" is required. The area 128 is used when the guidance to the "article" is required. The area 129 is used when the guidance to the punctuation mark is required. The area 130 is a preliminary area used for expanding the function of usage guidance of the present system.

These respective functions are picked and designated by the mouse. When the cursor is set by the mouse in a desired designation area to pick the same, the execution of the designated function is started. The termination of the execution of the function is designated also by the mouse. When the designation area of the function under execution is picked by the mouse, the execution of the function is terminated. The designation area of the function under execution is displayed different from other designation areas, for example, by use of a different color, bright display, shading or the like. By such display, the human friendly operation of the system is enhanced.

The present system also permits designation of a multi-stage function. During execution of a function designated, another function or the former function itself may be designated. For example, during correction of a conventional expression, guidance to the usage of a verb type may be used and guidance to the usage of a further verb type may be used additionally. Thus, the writer using the present system has a very large degree of option.

The operation of the present system of FIG. 1 will be outlined with reference to its flowchart. First, the basic display 110 of FIG. 32 appears and the word processor operation starts (step 1). Since the step 1 concerns the execution of well-known word processor functions, further description thereof will be omitted. The Japanese-English dictionary 34 and the English-Japanese dictionary 35 are mainly used in the word processor operation.

When a function designation area in the basic display 110 is picked by the mouse during word processor operation, it is determined what the picked function is like (steps 2-12). If an area other than the predetermined function designation area is picked, all the results of the determination at step 2-12 become NO and the processing returns to step 1. This processing reduces the malfunction of the present system due to a wrong operation of the mouse by the writer.

Figure 19:
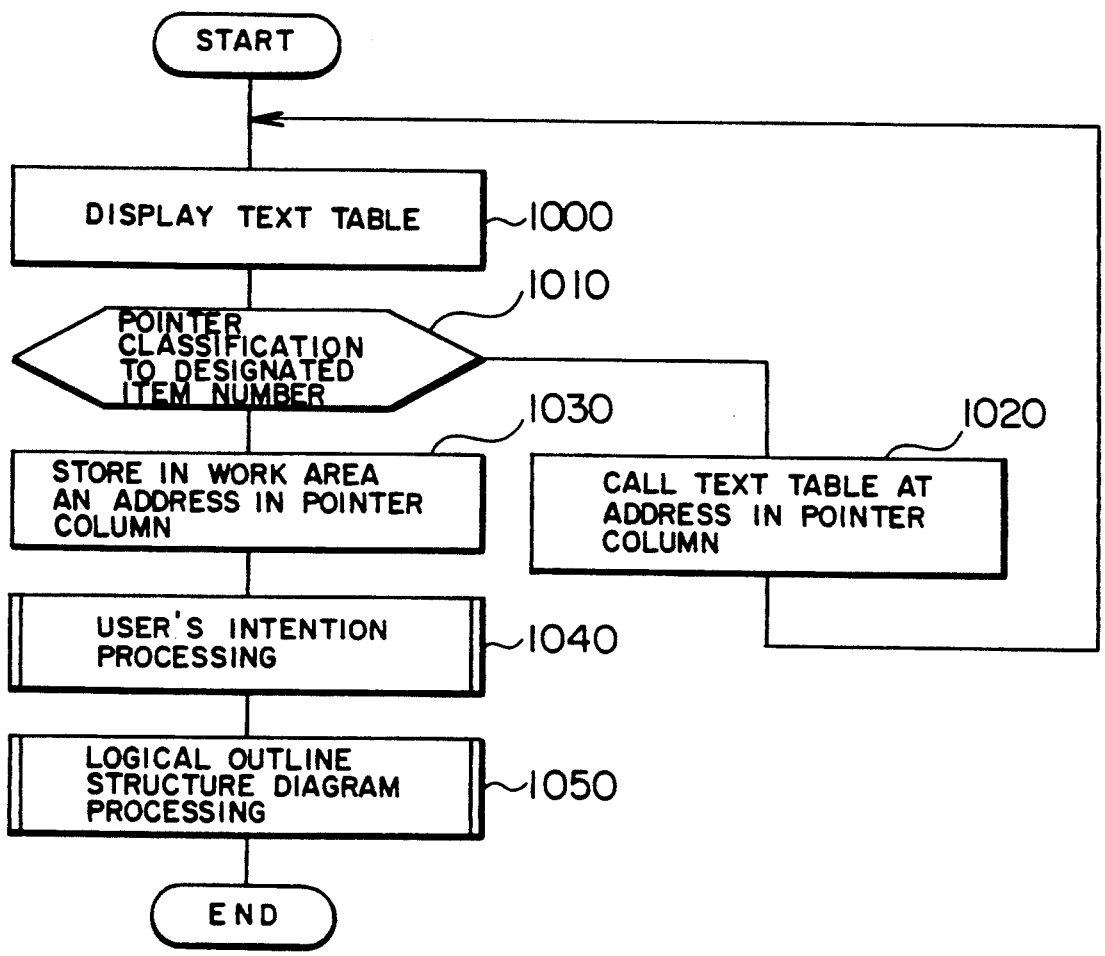
FIG. 19 is a flowchart indicative of a process for designation of a text type.

When the picked function is determined to be text designation at step 2, a text kind is designated at step 13. The details of the processing step 13 are shown in FIG. 19. At step 1000, a picture corresponding to the text classification table 51 (FIG. 4) is displayed. The corresponding picture shows the item numbers 55 and the corresponding contents of the text classification column 56 of the text classification table 51. When an item number is designated by the mouse, the kind of a pointer corresponding to the designated item number in the text classification table is determined (step 1010). If the contents of the pointer type column 57 are "continuation", the text classification table with the address stored in the pointer column 58 as the head is called (step 1020) and the called text classification table is displayed (step 1000). If the pointer type is determined as "end node" at step 1010, the address stored in the pointer column 58 corresponding to the item number designated in the text classification table is stored in the work area 44 (step 1030). Subsequently, the user's intention processing (step 1040) and a logical outline structure diagram processing (step 1050) are executed. User's intention processing and logical outline structure diagram processing will be described later in more detail.

Steps 1000-1030 will now be described more specifically. First, a picture corresponding to the text classification table 51 of FIG. 4 is displayed (step 1000). Assume that the writer has picked the "letter" to item number 1 using the mouse. When the contents of the pointer type column 57 corresponding to the item number 1 of the text classification table 51 are determined (step 1010), they are "continuation". Stored in the pointer column 58 is the head address of the text classification table 52 (FIG. 5). The text classification table 52 is called (step 1020), and the corresponding picture of the text classification table 52 is displayed (step 1000). Assume here that the writer has picked the "thanks" to item number 1 using the mouse. When the contents of the pointer type column 57 are determined (step 1010), they are "continuation". Stored in the pointer column 58 is the head address of the text classification table 53 (FIG. 6), which is then called (step 1020). At step 1000, the corresponding picture of the text classification table 53 is displayed. Further assume that the item number 1 has been selected. When the contents of the pointer type column 57 to the item number 1 of the text classification table 53 are determined (step 1010), they are "end node", so that the processing shifts to step 1030. Stored in the pointer column 58 to the item number 1 of the text classification table 53 is the address of the item number 2 of the logical outline structure diagram index table 54. This address is stored in the work area 44 (step 1030). The subsequent processing will be described below as the user's intention processing and the logical outline structure diagram processing.

Figure 20:
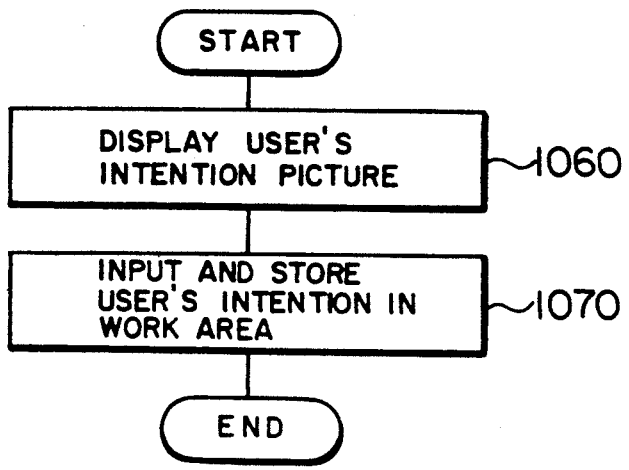
FIG. 20 is a flowchart indicative of a process for designation of the user's intention.

When the picked function is determined to be the designation of the user's intention at step 3, the designation of the user's intention (nuance) starts. The designation of the user's intention has the same meaning as the above mentioned user's intention processing (step 1040). The details of the Processing at step 14 will be described with reference to FIG. 20. At step 1060, the designated picture (FIG. 33) 135 of the user's intention is displayed on the output device 41. At step 1070, the user's intention is input and stored in the work area 44. The inputting of the user's intention is performed by the mouse. For example, (A) the item number 2 for a style, (B) the item number 1 for the length of the text, and (C) the item number 1 of the emphasis degree of the writer's emotion are selected by the mouse and stored in the work area 44 as a nuance to the text to be generated by the writer. While the item numbers for (A), (B) and (C) are described as being selected, the present system has default values which are caused to correspond to items not designated. The default values are (A) the item number 2 (neutral) for a style, (B) the item number 1 (middle) for the text length and (C) the item number 1 (neutral) for the emphasis degree of the writer's emotion.

Figure 21:
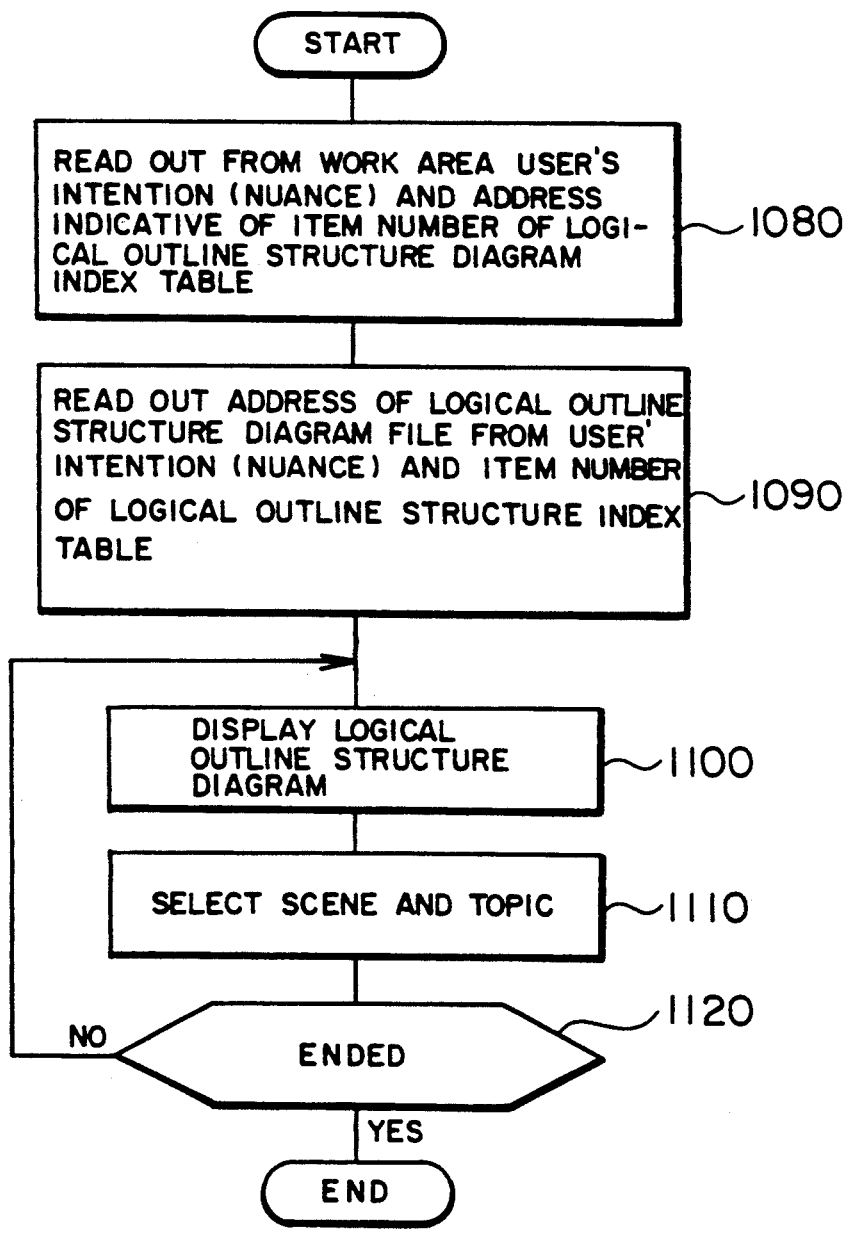
FIG. 21 is a flowchart indicative of the processing of a logical outline structure diagram.

When the picked function is determined to be a logical outline structure diagram at step 4, the processing of the logical outline structure diagram at step 15 is started. It is the same in meaning as the above mentioned logical outline structure diagram processing (step 1050). The details of the processing at step 15 will now be described with reference to FIG. 21. The address indicative of the item number of the logical outline diagram index table 54 stored at step 1030, and the nuance stored at step 1070 are read out from the work area 44 (step 1080). The nuance and address indicative of the item number of the logical outline structure diagram index table 54 are used to browse the 2-dimensional table (step 1090). Stored in the head portion of the logical outline structure diagram file is a matter to be described in the first paragraph of the designated text type. While the structure of the logical outline structure diagram file, etc., are not shown, an example presented on the display will be shown later. The read-out contents of the logical outline structure diagram file are displayed graphically on the output device 41 (step 1100). A scene and a topic are selected by the mouse in the logical outline structure diagram displayed (step 1110). At step 1120, it is determined whether the scene and the topic are selected with reference to the required paragraph. If not, the processing returns to step 1100.

The processing on the logical outline structure diagram will be described in detail using the above mentioned example (the example for the text designation and the example for user's intention designation.). The address indicative of the item number 2 in the logical outline structure diagram index table 54 has been stored in the work area 44 by the designation of the text type. According to the example for user's intention designation, the item number 2 (neutral) for a style, the item number 1 (shorter text) for the text length and the item number 1 (neutral emotion) for the emphasis degree of the writer's emotion have been selected and have been stored in the work area 44. The logical outline structure diagram index table 54 (FIG. 7) is browsed using these data to read, the address of the logical outline structure diagram 1 file. Assume that the processing of the logical outline structure diagram of the first paragraph is ended and that the logical outline structure diagram of the second paragraph is displayed on the output device 41.

Figure 34:
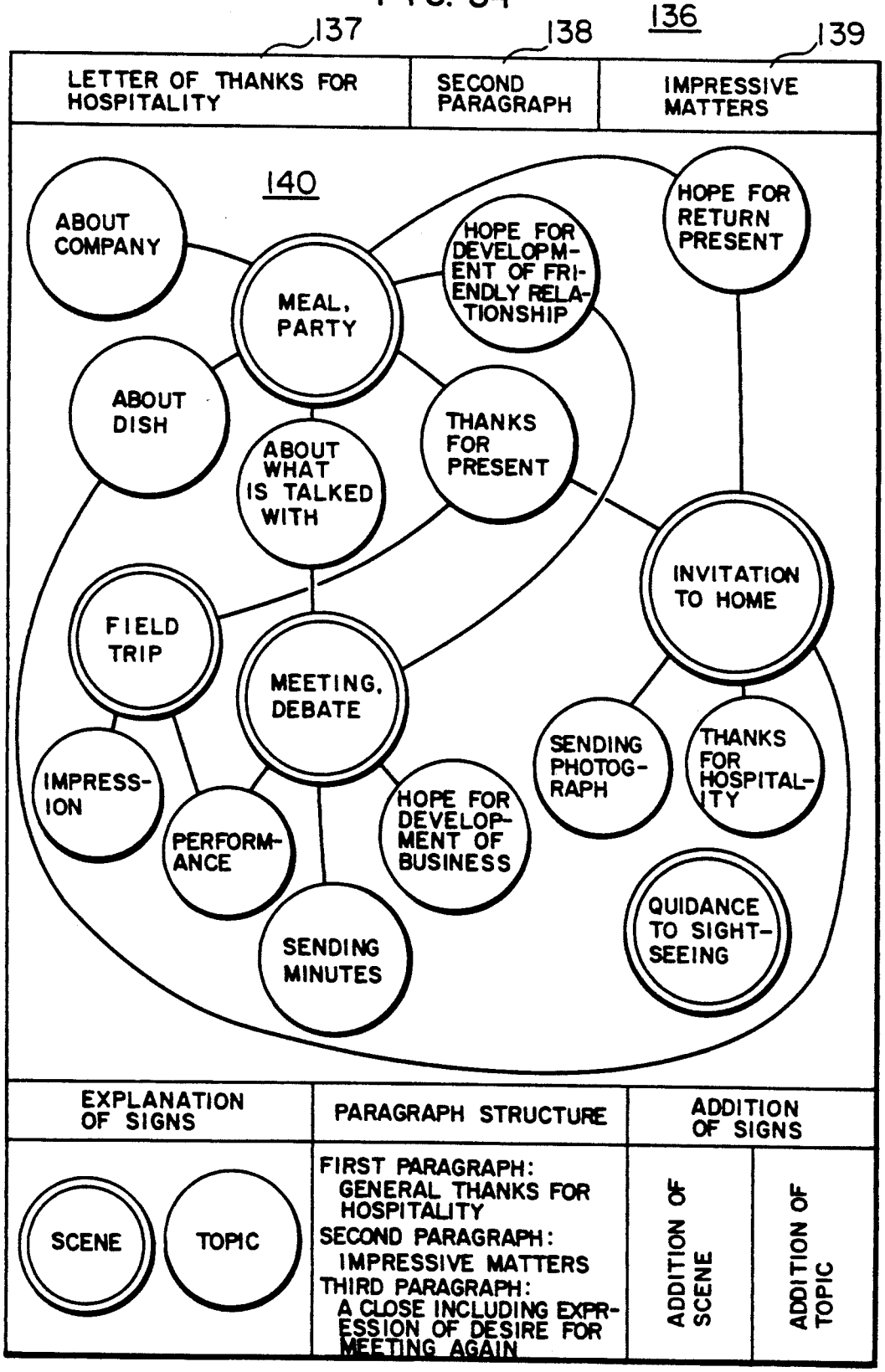
FIG. 34 shows one illustrative display of a logical outline structure diagram.

FIG. 34 shows an illustrative display of a logical outline structure diagram 136 which includes columns of a text type 137, a paragraph 138, a matter 139 to be described in the paragraph 138, a logical outline structure diagram 140 itself displayed graphically, comments such as descriptions on signs, etc. The logical outline structure diagram 140 itself is indicated by double circles indicative of scenes such as "meal, party", or "meeting, debate", singular circles indicative of topics such as "about cooking", or "thanks for a present" in these scenes, and lines indicative of the relations between the scenes and topics. The writer picks, using the mouse, a scene represented by a double circle and topics indicated by a singular circle related to that scene. For example, "meeting, debate" is picked and "performance", and "hope for development of business" are then picked. When a plurality of topics are selected as just described above, the sequence of generation of a text follows the sequence of selection of those topics. Similarly, the sequence of generation of a text when a plurality of scenes is selected follows the sequence of selection of those scenes. The selected scenes and topics are displayed different from others, for example, by coloring.

The sequence of generating the text designated as mentioned above is stored in the work area 44 when the result of the determination at step 1120 is YES. Also, when the designation area 113 of the logical outline structure diagram of the basic display 110 is picked by the mouse and the processing of the logical outline structure diagram is terminated, the sequence of generation of the text designated so far is stored in the work area 44.

A text generation sequence such as that mentioned above is produced for each paragraph. The paragraph is updated with the next one by picking the paragraph column 138 using the mouse. While the processing of the logical outline structure diagram is terminated when the processing of the final paragraph is terminated in the flowchart of FIG. 21, the termination of the processing may be only when the designation area 113 of the logical outline structure diagram of the basic diagram 110 is picked by the mouse and the logical outline structure diagram of the first paragraph may be displayed when the paragraph column 138 is picked by the mouse at the final paragraph. While in the above description the logical outline structure diagram is displayed graphically so as to be intelligible to the writer, it may be replaced, for example, with the display of a logical outline structure in a table or a display using characters and signs alone.

Figure 22:
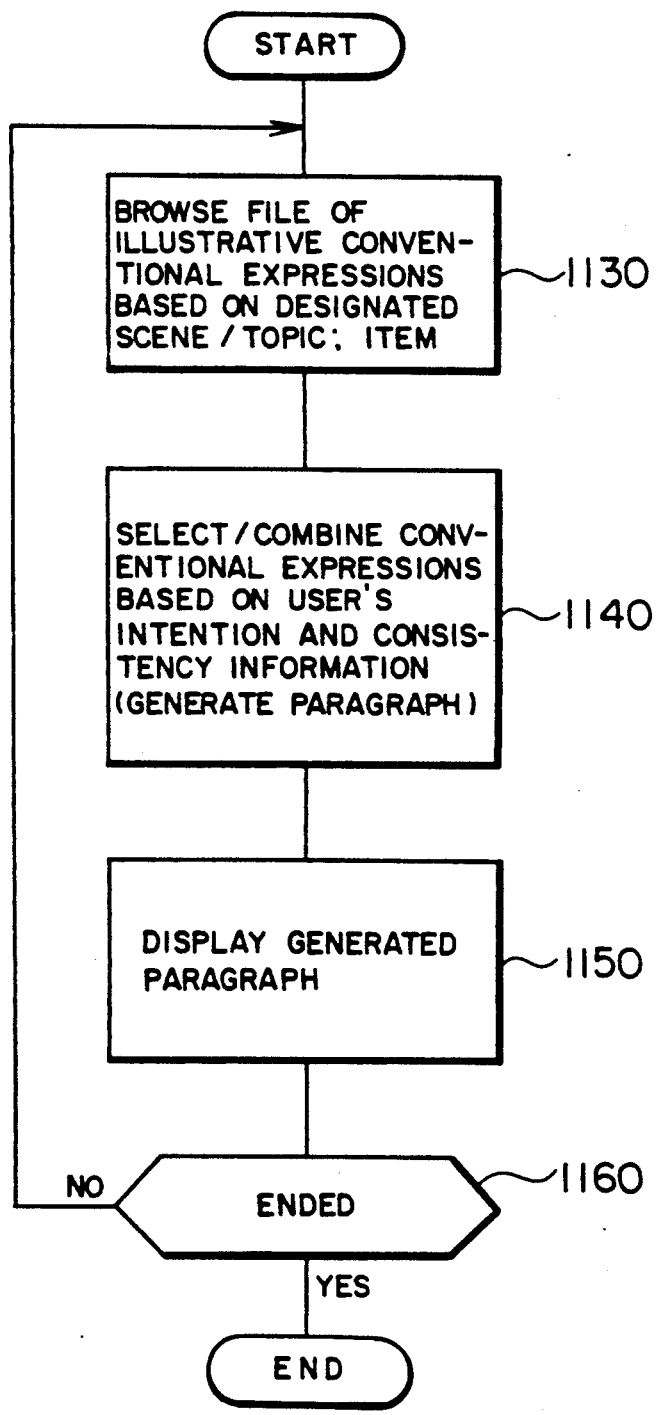
FIG. 22 is a flowchart indicative of a process for generation of a conventional expression.

When the picked function is determined to be the generation of a conventional expression at step 5, the generation of a conventional expression is started at step 16, the details of which will be described with reference to FIG. 22. Conventional expressions corresponding to topics and scenes following the designated logical outline structure stored in the work area 44 are retrieved from the collection of illustrative conventional expressions 31 (step 1130). If, for example, the scene is "meeting, debate" and the topic is "performance", retrieval is made in the file of illustrative conventional expressions 59 shown in FIG. 8. The designated logical outline structure stored in the work area 44 has not necessarily been subjected to the processing of the logical outline structure diagram. As mentioned above, the writer can set a desired logical outline structure directly in the work area 44 using the "help" function. A conventional expression satisfying the user's intention stored in the work area 44 is selected from the file of illustrative conventional expressions 59 (step 1140). In order to display the selected conventional expression on the output device 41, that conventional expression is stored in the vertical scrollable display memory, which is provided in the word processor in accordance with a well-known process. The selected conventional expression is displayed in the text generation area 131 of the basic display 110 and the item number of the conventional expression, etc., are stored in the work area 44 (step 1150). It is determined whether a conventional expression has been generated for every paragraph (scene, topic) (step 1160). If not, the processing returns to step 1130.

The generation of the conventional expression will be described in more detail below. Consistency information 65 is contained in the file of illustrative conventional expressions 59 for each scene and topic shown in FIG. 9. As mentioned above, the consistency information 65 is such that when one conventional expression is selected from conventional expressions having the same numeral and such selection of a conventional expression is repeated in the ascending order of numerals, a paragraph is generated with those selected conventional expressions. Therefore, one conventional expression must be selected from the conventional expressions for the same numeral. This selection depends on the user's intention. The user's intention for each conventional expression is displayed in the columns of style 62, length 63 and emphasis degree of writer's emotion 64 in the file of illustrative conventional expressions 59. The user's intention as a reference of selection is stored in the work area 44, as mentioned above. Therefore, a conventional expression following the user's intention stored in the work area 44 is required to be selected from the file of illustrative conventional expression 59. When consistency information is in the phase of 1, and if the user's intention stored in the work area 44 is such that the style is N (Neutral), that the length is small and that the emphasis degree of the writer's emotion is medium, "The meeting was both informative and enjoyable." for the item number 1 is selected from the file of illustrative conventional expressions 59.

When the consistency information takes any particular value, there are cases where a conventional expression following the user's intention as a reference is not found in the file of illustrative conventional expressions. For example, a conventional expression where the style is N (neutral), the length is small and the emphasis degree of the writer's emotion is medium is not included in the file of illustrative conventional expressions 59. In such a case, a conventional expression closest to the expression of the user's intention as a reference is selected. If there is no level of nuance coinciding with each of items indicative of the user's intention in the selection of the closest conventional expression, that selection is made by selecting a conventional expression which replaces the nuance with "neutral" or "medium" for each item or which a conventional expression where two of the three items coincide. By employing such selection, conventional expressions for all the combinations of items indicative of the user's intention need not be prepared and the capacity of files for the file of illustrative conventional expressions 31 may be reduced. It is to be noted that the reduction of the number of conventional expressions is not intended. Duplication of the same conventional expression should be avoided in the file of illustrative conventional expressions 31 because there are not a few cases where the same conventional expression is used to express slightly different user's intentions (nuances).

Now, the relationship between consistency information and the length of a text will be described. Generally, texts start to describe their outline or conclusion at the beginning and then shift gradually to their details in many cases. Thus, in many cases, shorter, medium, and longer sentences correspond to in the ascending order of numerals of the consistency information. Therefore, one kind of information can be said to suffice in selection of a conventional expression. The structure of a text can be employed in which first a slightly long sentence representing friendship appears and a plain sentence then appears gradually when occasion demands. In order to allow both items of consistency information and sentence length to be handled separately, both the items are provided in the file of illustrative conventional expressions.

As a part of the processing, the use of the file of general-purpose illustrative conventional expressions 66 shown in FIG. 9 is supported. This is used, for example, when a conventional expression in the file of illustrative conventional expressions corresponding to the scenes and topics cannot satisfactorily reflect the writer's intention. As mentioned above, the file of general-purpose illustrative conventional expressions 66 is prepared for each paragraph of the designated text. The processing such as selection of a general-purpose conventional expression and the storage of the item number of the selected general-purpose conventional expression, etc., in the work area 44 is similar to that in the file of illustrative conventional expressions corresponding to the above mentioned scenes and topics. The use of the file of general-purpose illustrative conventional expressions 66 will be described later.

Figure 23:
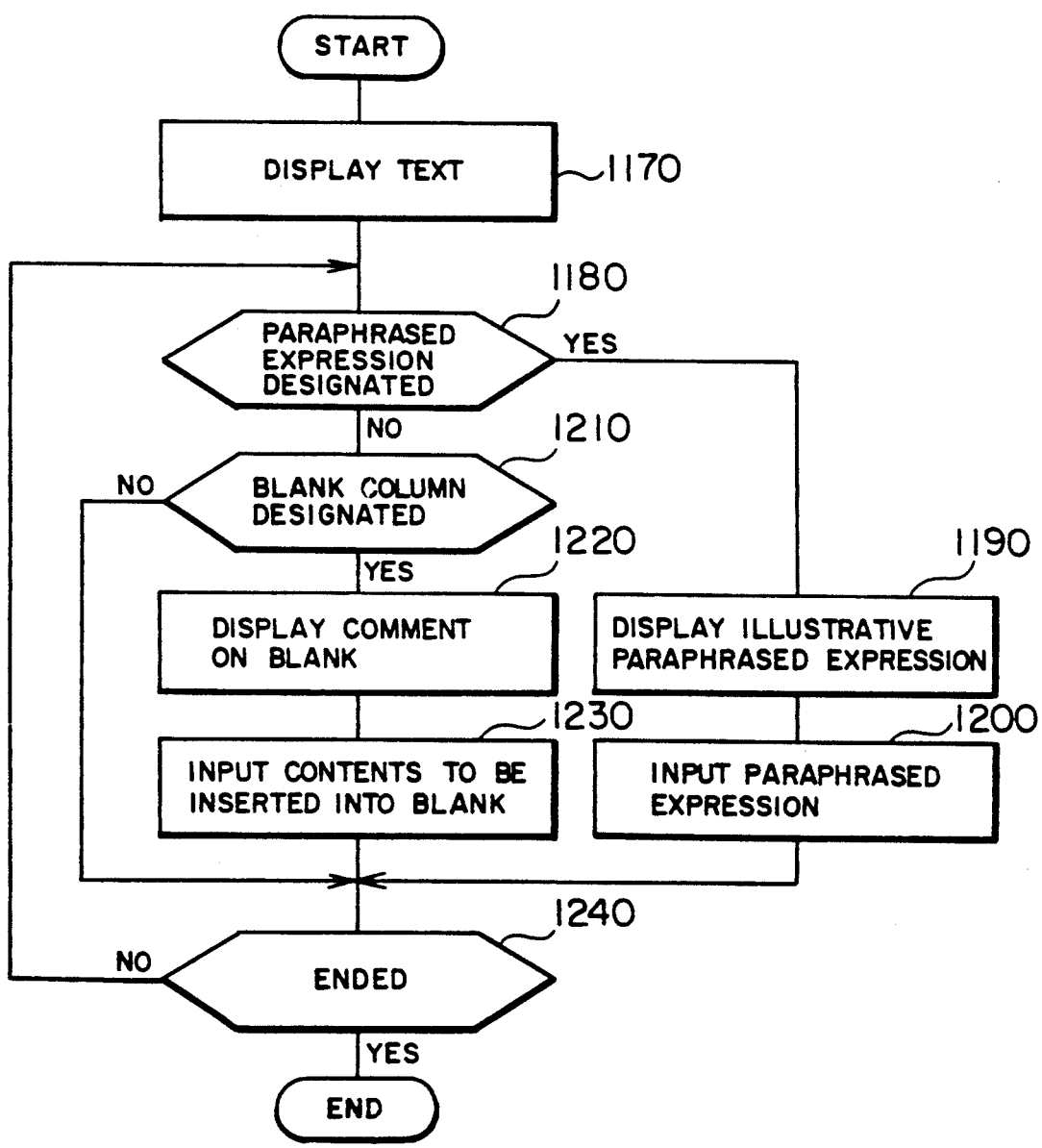
FIG. 23 is a flowchart indicative of a process for correction of conventional expression.

As a part of conventional expression generation, method of combining completely free sentences with conventional expressions is supported. The designation area 114 for generation of a conventional expression in the basic display 110 can be picked by the mouse at any time during generation of a conventional expression to return to the word processor operation (step 1) of FIG. 1. After completely free sentences are made, the generation of a conventional expression can be started again. Thus, the method of combining completely free sentences with conventional expressions is realized. If the picked function is determined to be correction to the conventional expression at step 6, the correction to a conventional expression at step 17 starts. The details of the processing at step 17 will be described with reference to FIG. 23. A text stored in the display memory is displayed in the text generation area 131 of the basic display 110 (step 1170).

The paraphrasable expression in the sentence produced in the generation of the conventional expression is displayed different from the expression of other portions. The paraphrasable expression is grammatically or contextually meaningful masses such as words, idioms, and idiomatic phrases constituting a sentence. Therefore, the masses each are not necessarily composed of successive words constituting an idiom or idiomatic phrase. The different display is by different color, bright indication, reversal, shaping, underline, or the like. In summary, it is to indicate paraphrasable expressions such that the writer can easily recognize them. Blanks in the sentence generated using a general-purpose conventional expression are displayed different from other portions of the sentence as is the paraphrasable expression as mentioned above. As described with reference to FIG. 9, the general-purpose conventional expression is prepared as a paragraph, so that some of word, idioms and idiomatic phrases constituting a sentence have a high degree of option. The blank is the one which has such a high degree of option indicated in blank. The indication of a blank portion different from other portion is also intended to allow the writer to easily recognize the difference of the blank from other portions. Especially, such indication is intended to clarify the difference of the blank portions having a high degree of option from mere blanks such as a blank accompanying the end of a paragraph and a blank accompanying a blank line.

It is determined at step 1180 whether the paraphrasable expression portion in the sentence generated in the generating process of the conventional expression is designated or not. This designation is performed by picking the paraphrasable expression using the mouse. If the paraphrasable expression is designated a paraphrasable expression or comment corresponding to the designated paraphrasable portion is displayed (step 1190). The displayed contents are an alternative to one of the file of illustrative conventional expressions 31 shown in FIG. 24. The file of alternative expressions 180 of FIG. 24 is stored in the file 31 for the file of illustrative conventional expressions corresponding to the file of illustrative conventional expressions 59 shown in FIG. 8. The file of alternative expressions 180 includes a column of a paraphrasable conventional expression 181 and a corresponding column of an alternative expression 187 to the conventional expression for each pair of scene 60 and topic 61. The file of alternative expressions 180 is referred to in order to recognize the paraphrasable expressions described at step 1170 when it is displayed. The display of an alternative expression will be described specifically. Assume that "The meeting was both informative and enjoyable." to the item number 1 in FIG. 8 is contained in a text. According to FIG. 24, "The meeting", "informative and enjoyable" and "was both informative and enjoyable" are paraphrasable expression portions. In this case, since "informative and enjoyable" and "was both informative and enjoyable" have a duplicate portion, one of them is displayed in a different color while the other is displayed with an underline. If any portion of the "informative and enjoyable" is picked by the mouse, the "informative and enjoyable" is determined as being designated. If any portion of the "was both" is picked, the "was both informative and enjoyable" is determined as being designated. When "The meeting" is designated, "the user is requested to describe a specific meeting name" is displayed. This comment is displayed overlapped in the basic display 110 displayed on the output device 41 by the mouse such that the necessary portion of the basic display 110 is not shielded by multiwindow control. If the number of displayed characters is small, the comment can be displayed in the message output area 132 of the basic display 110. In conformity to this comment, the writer keys in "meeting name" through the keyboard. The keyed-in characters are displayed in the input character display area 133 of the basic display 110. The writer checks whether there are no errors involved in the keyed-in data. If no, he or she presses predetermined keys such that "The meeting" replaces the characters displayed in the input character display area 133. In this case, for example, those data may be input in Japanese, and the Japanese-English dictionary 34 may be then used to translate those Japanese data to English one and to replace the previously indicated data. The operation of the system performed when the "was both informative and enjoyable" is designated will be described next. (1) The "was of great value to me" and (2) the "inspired me with strong incentive in my work" are displayed. If the writer wants to replace the designated wording ("was both informative and enjoyable") with "was of great value to me", one of (1) and (2) should be selected by any one of the following two methods. (2). The first method includes picking the indicated (1) or (2) using the mouse. The other method includes keying in the numeral "1" or "2" corresponding to the (1) or (2), respectively, from the keyboard. If the (1) is selected, the "was of great value to me" is indicated in the message output area 132. After the writer confirms that there is no error involved, he or she presses predetermined keys. The "was both informative and enjoyable" replaces the "was of great value to me" indicated in the input character display area 133. That is, the alternative expression is keyed in (step 1200).

The operation of the system performed when a general-purpose conventional expression 66 is contained in the generated text will be described. At step 1210, it is determined whether a blank contained in the general-purpose conventional expression is designated or not. This designation is performed by picking the blank using the mouse. If the blank is designated, a comment corresponding to the designated blank is displayed (step 1220). The displayed contents of the comment are for a blank indicated in the file of general-purpose illustrative conventional expressions 66 (FIG. 9). The writer inputs contents to be inserted in the blank in accordance with that comment (step 1230). The method of displaying the comment and the method of inputting the comment are the same as those used in steps 1190 and 1200. The insertion of the general-purpose conventional expression 66 into the blank is also used at the stage of generation of the above mentioned conventional expression. The method follows the steps 1210 to 1230. If the contents of the general-purpose conventional expression have been inserted in the blank at the stage of generation of the conventional expression, the original blanks among words and/or idioms are displayed different from other portions. Correction to the conventional expression is executable by regarding the original blanks as blank portions even under such situation.

Figure 25:
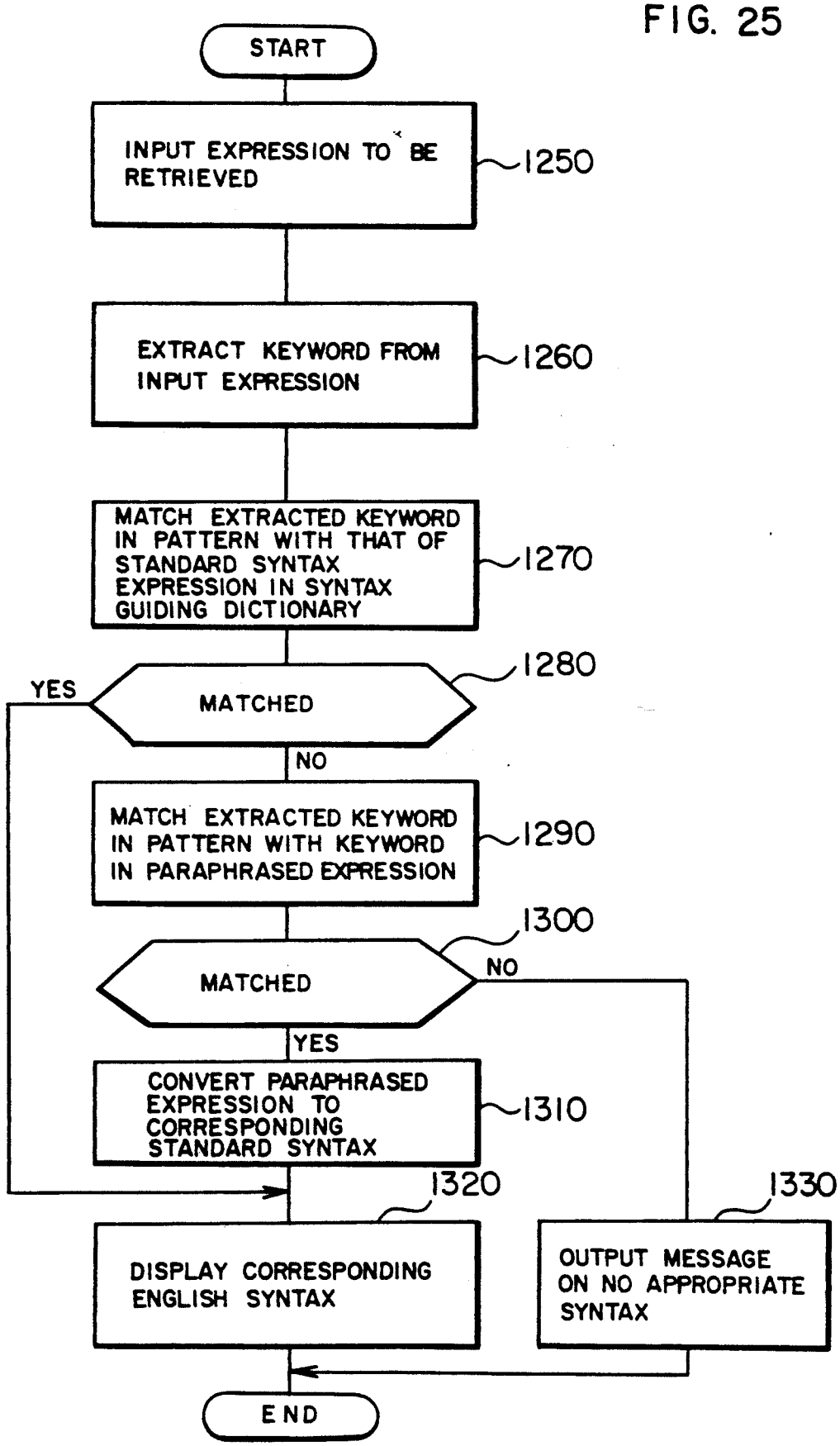
FIG. 25 is a flowchart indicative of a process for guidance to a syntax.

If the picked function is determined to be guidance to the syntax at step 7, the execution of guidance to the syntax at step 18 is started, the details of which will be described with reference to FIG. 25.

The writer keys in data an expression to be retrieved (step 1250) and extracts a keyword from the keyed-in expression (step 1260). In the present system, the expression to be retrieved is keyed in by a syntactical dependency relation, such as, "zuzushikumo . . . suru", as shown in FIG. 10. There are many expressions concerning syntactical connections such as, for example, "kanarazu . . . suru", "mattaku . . . shinai", etc., in addition to the examples shown in FIG. 10 or 11. A keyword is extracted from these keyed-in expressions. To this end, a table where unnecessary words are stored beforehand is prepared. The table stores "suru" which represents a verb generally; postpositional words, "ha" and "ga", functioning as an auxiliary to a main word; the auxiliary verb "da", etc. The words stored in the unnecessary word table are deleted from the input expressions and the remaining words are used as the keywords. A specific example will be described later.

The extracted keyword is retrieved from the keyword column of the syntax guiding dictionary 71 (FIG. 10) indicative of English syntax corresponding to a standard syntax expression in the syntax guiding dictionary 32 (step 1270). If the extracted keyword is retrieved from the dictionary 71, the processing shifts to step 1320 (step 1280). If not, the keyword column of the syntax guide 76 (FIG. 11) indicative of paraphrasable expressions is checked (step 1290). If no keyword is retrieved in the guide 76 (step 1300), a message to the effect that there is no syntax correspondence to the input expression is output to the message output area 132 of the basic display 110 (step 1330) and the processing ends. If the keyword is detected in the syntax guide 79 indicative of paraphrased expressions, the standard syntax number column 80 of the syntax guide 76 indicative of paraphrased expressions is referred to and a standard syntax number corresponding to the keyword is obtained (step 1310). Since the standard syntax number represents the item number of the syntax guiding dictionary 71 indicative of an English syntax corresponding to the standard syntax expression, the corresponding standard syntax expression is obtained and displayed (step 1320). The standard syntax expression and corresponding English syntax is displayed overlapped in the basic display 110 by multiwindow control in corresponding relationship. They may be output to the message output area 132 of the basic display 110. Since it is necessary to ensure a wide text generation area 131 in the design of the display of the output device 41 in order to improve the human-friendly operation of the system, it is generally difficult to obtain a wide message output area 132. Since there are cases where a standard syntax expression to be displayed, the English syntax and standard syntax expression are preferably displayed separately on logically different displays by multiwindow control.

The syntax guide will be described more specifically. Assume that ". . . suruyori . . . suruhougamasida" is input as an expression to be retrieved. If "suru", "ha", "ga" and "da" which are prepared as unnecessary words are deleted, "yori", "hou" and "mashi" will remain. The syntax guiding dictionary 71 indicative of English syntaxes corresponding to standard syntax expressions is browsed using "yori", "hou" and "mashi" as the keywords. A combination of the keywords "yori", "hou" and "mashi" cannot be found in the syntax guiding dictionary 71 indicative of English syntaxes corresponding to standard syntax expressions. Therefore, the syntax guide 76 indicative of paraphrased expressions is browsed using the same keyword. There are keywords "yori", "hou", and "mashi" in the item number 3 and they are detected. Standard syntaxes 31 and 32 are stored in the standard syntax number column 80 to the item number 3 of the syntax guide 76 indicative of paraphrased expressions. The English syntaxes "might as well V (Verb) . . . as V (Verb) -" and "would sooner V (Verb) . . . than V (Verb) -" are obtained from the item numbers of the syntax guiding dictionary 71 indicative of a standard syntax expression and the corresponding English syntax corresponding to the numbers 31 and 32, and displayed.

Figure 26:
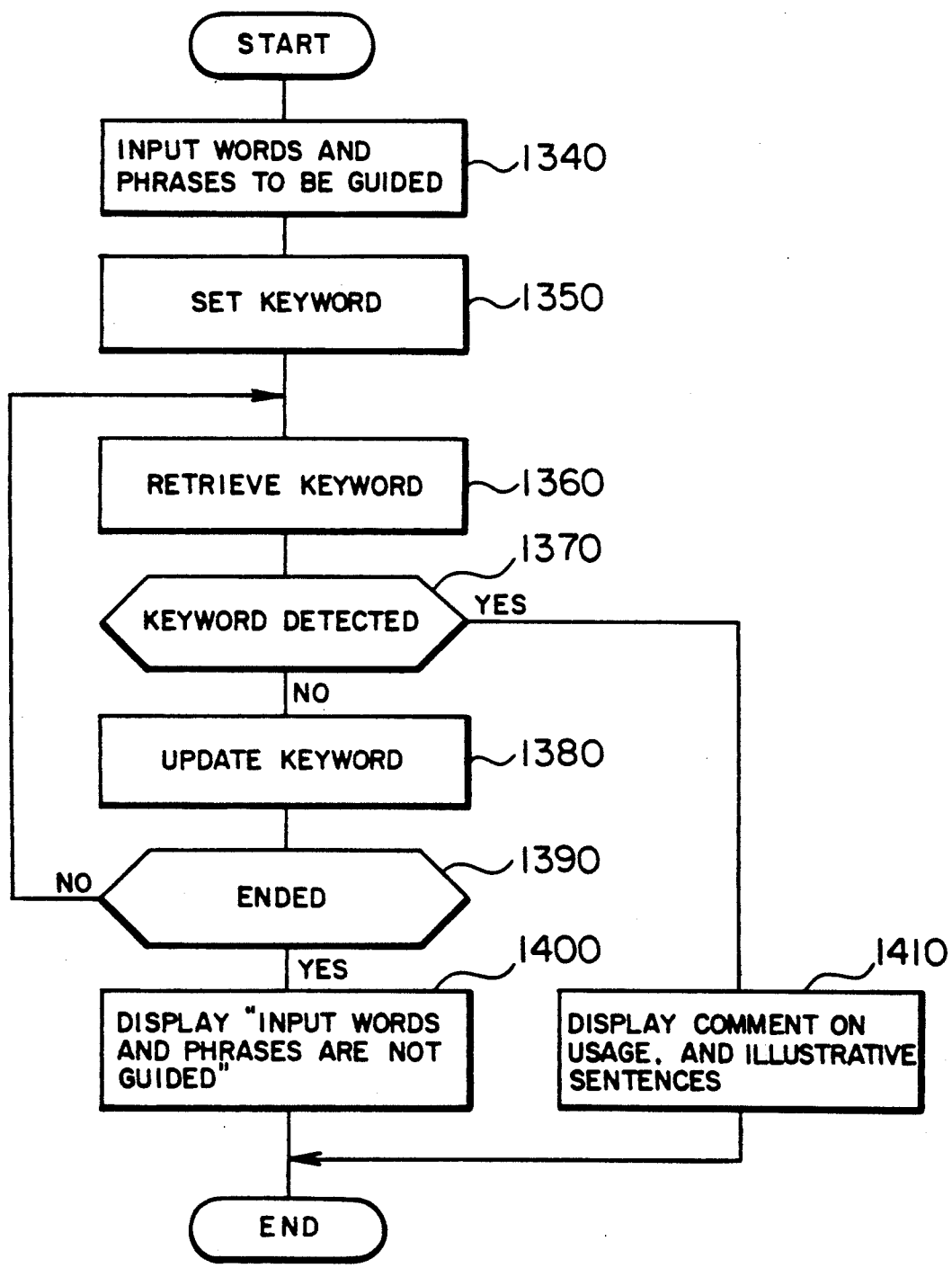
FIG. 26 is a flowchart indicative of a process for guidance to usages.
Figure 32:
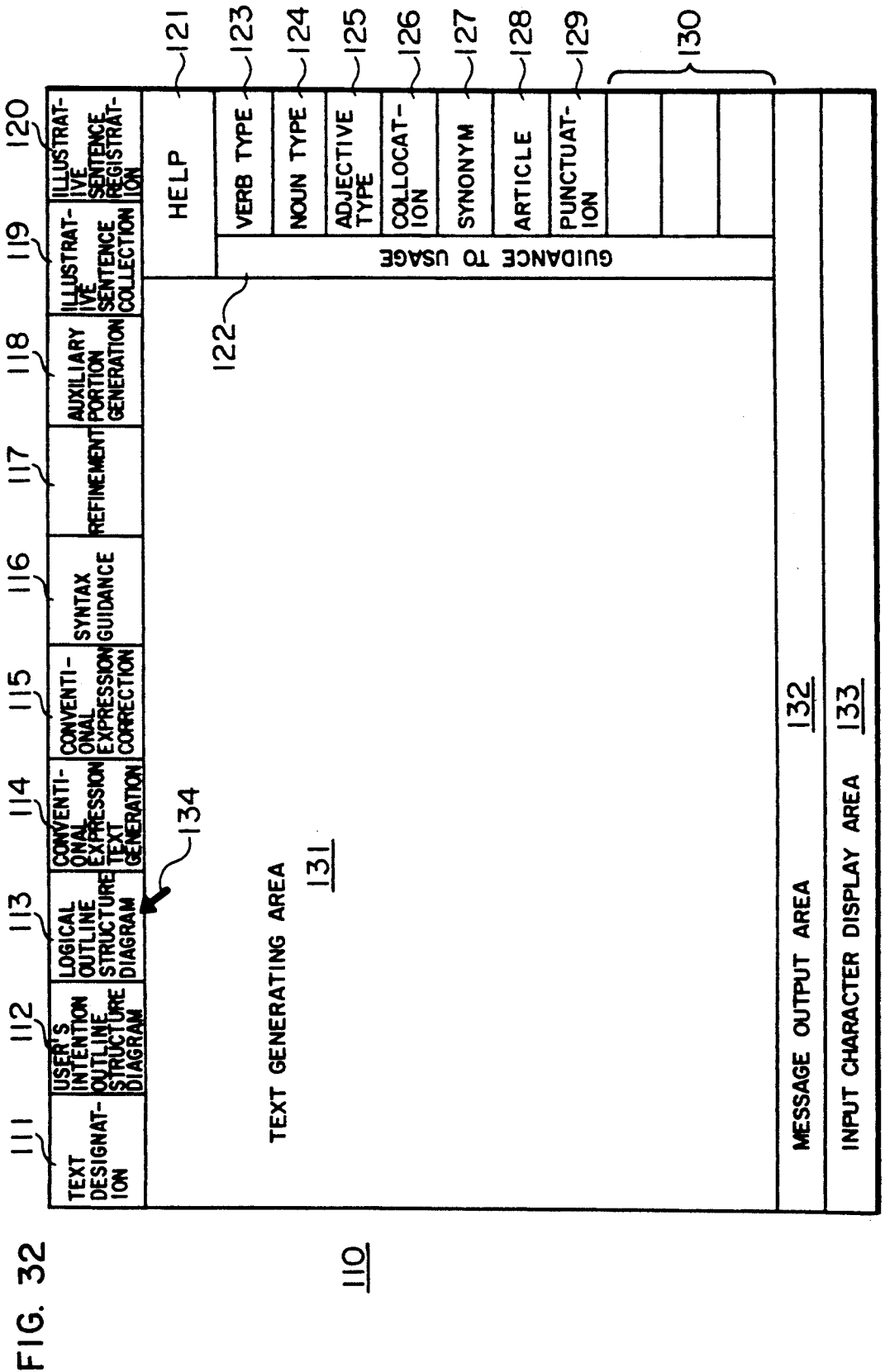
FIG. 32 shows the basic illustrative display structure of an output device in the computer aided text generation system according to the present invention.

If the picked function is determined to be guidance to usage at step 8, the processing for the guidance to the usage at step 19 is started. The guidance to the usage is mainly to words, idioms and idiomatic phrases. As mentioned above, the guidance to the usage involves the usage of a verb type, a noun type, an adjective type, a collocation, a synonym, an article and a punctuation. The guidance to the usage is designated for each kind of guidance although abbreviated in FIG. 1. For example, a verb type 123 of the basic display 110 of FIG. 32 is picked by the mouse. The basic processing is the same irrespective of the kinds of guidance, so that their respective descriptions will be omitted. The basic processing of the guidance to the usage will now be described with reference to FIG. 26 as the details of the processing at step 19.

First, the writer keys in words and phrases which requires guidance to the usage through the keyboard (step 1340). The words and phrases may be input by picking with the mouse a word or a word string of a text generated already in the text generation area 31. The first word of the input words and phrases is used as the keyword (step 1350). The keyword is retrieved in the designated usage guiding dictionary (step 1360). If the keyword is found (step 1370), a comment and illustrative sentences for that usage are displayed (step 1410). These are also displayed overlapped in the basic display 110 by multiwindow control. If the keyword cannot be found (step 1370), it is updated (step 1380). The update of the keyword includes the use of the next word as a keyword. That is, if the first word as the keyword cannot be found in the designated usage guiding dictionary, the second word is used as the keyword. When a new word is designated (step 1390), the processing returns to step 1360. If all the words have been used as the keywords (step 1390), the message "the input words and phrases are out of guidance to the usage" is displayed in the message output area 132 (step 1400) and the processing ends.

Guidance to the usage of articles will now be described as an example. Assume that the word "chicken" is input as a word which requires guidance. The usage guiding dictionary 81 for the usage of articles is browsed with the "chicken" as the keyword. The coincidence between the headword "chicken" of the usage guiding dictionary 81 and the keyword is detected. Comments, etc., corresponding to "chicken" are displayed overlapped in the basic display 110 by multiwindow control. More specifically, the following contents are displayed. If the contents of the article type column 83 is 1 for "chicken", and the table of FIG. 13 is displayed as the explanation of the article type. The following contents of the article usage column 84 are displayed, A chicken as a living being is a countable noun,
Fowl as food is an uncountable noun.

Further, an illustrative sentence 608 indicated in the illustrative sentence number column 85 is retrieved from the illustrative sentence registration dictionary 39 and displayed.

The guidance to the usage of collocations will now be described. Assume that "accept a good idea from his proposal" is input as a phrase the usage of which requires guidance. The usage guiding dictionary for collocations is browsed with the first word "accept" as the keyword. The usage guiding dictionary 86 for collocations where the dictionary number shown in FIG. 14 is 18 and where the headword is "accept" is browsed. The usage guiding dictionary 86 for collocations containing the "accept" is then browsed. The browse in this case effected with as the keyword a word other than "accept" input as the word the usage of which requires guidance in order to detect idiomatic phrases, etc. If the browse ends, the meaning of the word, etc., are displayed in the form of a comment and illustrative sentences concerned are displayed as was the example of the above mentioned articles. In the case of "accept", the meaning and illustrative sentences concerning the "accept ... from" shown at the item number 5 of the verb type in FIG. 14 are illustrated. Words other than the keyword "accept" are sequentially retrieved as words which requires guidance to their usage although their description are omitted in the flowchart of FIG. 26. Words "a", "good", "idea", "from", "his" and "proposal" are used successively as the keywords.

Figure 27:
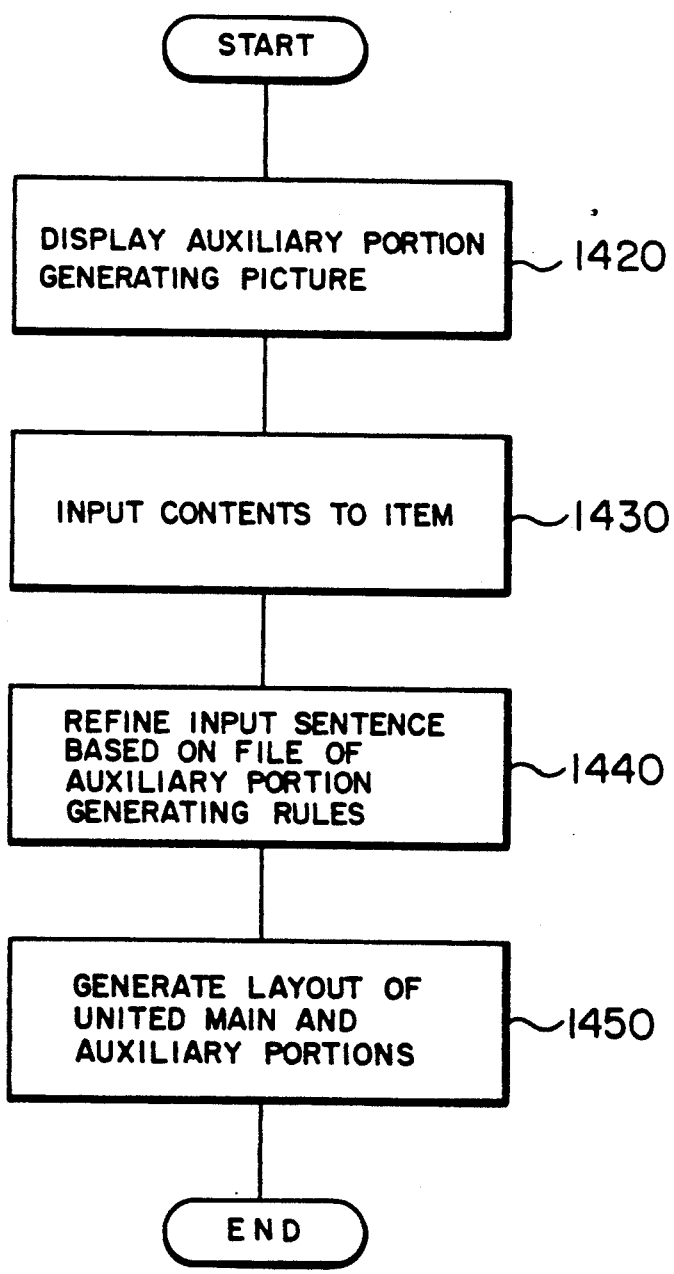
FIG. 27 is a flowchart indicative of a process for generation of auxiliary portions.

When the picked function is determined to be the generation of auxiliary portions at step 9, the generation of the auxiliary portions is started at the step 20, and the basic generation of the auxiliary portions will now be described as the details of step 20 with reference to FIG. 27.

First, the auxiliary portion generation picture is displayed overlapped in the basic display 110 by multiwindow control (step 1420). The auxiliary portion generation picture is stored as files in the file of auxiliary portion generation rules 38. An example of a letter 141 shown in FIG. 35 will now be described. The files for auxiliary portion generation pictures are stored together with the corresponding files for format pictures in pairs in the file of auxiliary portion generating rules 38. The pairs of files for auxiliary portion generation pictures and format pictures are prepared for texts having a predetermined format, or texts using a given format customarily, having high probability of repeated use such as invitations, invitations to meetings, order tables, or applications in addition to letters.

The writer inputs the contents of an item to the auxiliary portion generating picture 141 (step 1430). As will be obvious in FIG. 35, the auxiliary portion generating picture 141 uses a menu system so that the writer can easily input data. Some of input items of FIG. 35 will be described. The first name, middle name and family name of an addressee to which you write a letter are input in order to the addressee's name column of the item 1. As shown, the input column indicates the "first name", "middle name" and "family name". When the characters are input, they are displayed in the entry column in place of the characters displayed so far. The number of characters of the first name, etc., need not be smaller than the number of characters displayed already such as "family name", etc., displayed originally in the entry column, and the end of the respective names is identified by inputting a space therebetween, for example, one or more spaces between the first name and the middle name. Matters input using a method similar to that used for the item 1 are a address to item 5 and a data to item 6. An optional item is selected by the mouse for the term or respect for the addressee to item 2. For example, "Mr." is picked. If "others" is selected, the display of each optional item is erased and the cursor is moved to the input character display area 133 and specific contents are required to be input. Other matters input using a method similar to that used for the item 2 are a calling to the addressee to item 7 and a complimentary close to item 8. The post name of the addressee to item 3 is input in accordance with the cursor displayed in the input character display area 133. An example of a process for inputting data in this case will be described. Assume that "semmu" is input. Referring to the Japanese-English dictionary 34, (1) "a managing director" and (2) "an executive director" are displayed in the message output area 132 in response to the input. The writer selects one of them. The writer may input those data directly in English. Similarly, data to item 4 is also input. A layout to item 9 is input in a selective manner like that to item 2. The optional items "full block, semi-block, and block" as are a format determined beforehand in accordance with indention. The format corresponds to the format picture, as mentioned above. While respective items are input in a manner mentioned above, items unnecessary for texts may be omitted and matters to items other than the input ones may be added conversely.

When the inputting of matters to necessary items have been completed, the contents to the input items and input sentence are refined in accordance with various rules stored in the file of auxiliary portion generation rules 38 (step 1440). An input address will be described as an example of text refinement. An abbreviation is detected from the input address. Words whose character strings are ended with a period (.) are detected and handled as an abbreviation. It is checked whether the respective detected abbreviations are in a table of address abbreviations 99 (FIG. 17). If so, the abbreviations are determined to be correct and the refining process ends. If not, an abbreviated form similar to that abbreviation is detected from the table of address abbreviations 99. If, as a result of retrieval, an abbreviation is deleted which coincides with that portion of the input abbreviation except for the period (.) with any one character of the character string of the input abbreviation being handles as a "don't care", the detected abbreviation is used as a similar abbreviation. A combination of two or more characters may be handled as "don't care", but the number of characters of an abbreviation is generally small, so that the "don't care" of one character will suffice in many cases. If a similar abbreviation is detected, it is displayed in the message output area 132. At this time, the abbreviation as the origin of similar abbreviations in one of the character strings input in the auxiliary portion generation picture 141 is displayed different from other character strings. For example, if those other strings are displayed black, the appropriate abbreviation may be displayed red. By such display, the writer can easily recognize and correct errors in the input data, if any.

Another example of text refinement will be described. Assume that the term of respect "Prof." is input. Referring to the rules stored in the file of auxiliary portion generation rules 38, the comment "Usually, "Professor" is used" is displayed. By such display of the comment, the writer is given advice. The present system is capable of coping with the problem that the entry of a data varies from nation to nation. The name of a nation input last in conjunction with the "address" to input item 5 is used as a clue and the rules stored in the file of auxiliary portion generation rule 38 is referred to and the sequence of entry of the data is automatically converted to that following the custom of the nation. Spelling check, check of an error in the use of homonyms of Chinese characters, etc., are realized using well-known techniques.

The auxiliary portions generated as mentioned above are united with the main text and displayed in accordance with the designated format (step 1450). This display is effected in order to allow the writer to confirm the final contents and format of a text generated by the writer. If the text contains undesirable portions, the writer is able to further correct them.

Figure 28:
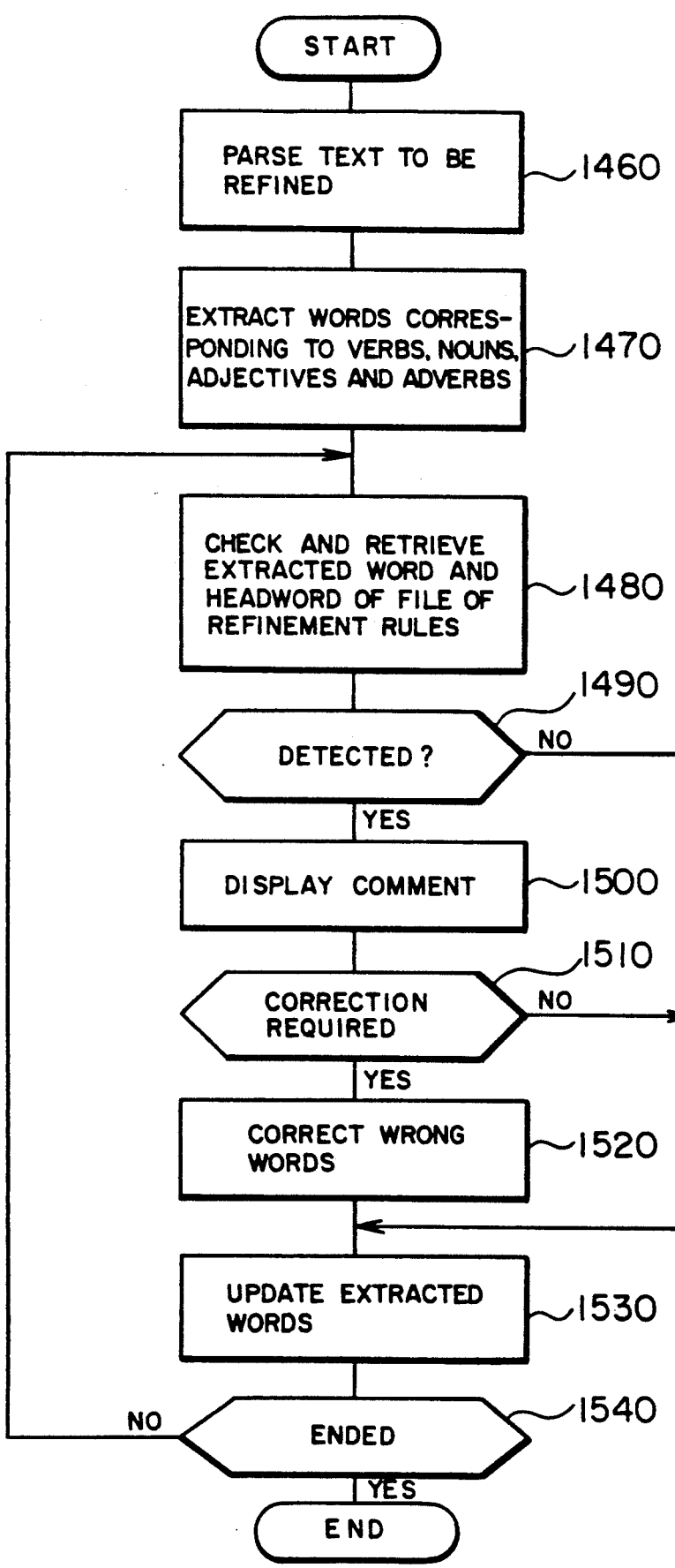
FIG. 28 is a flowchart indicative of a process for aid to text refinement.

If the picked function is determined to be text refinement backup at step 10, the text refinement backup is started at step 21. The basic processing for the text refinement backup will be described as the details of the processing at step 21 with referent to FIG. 28.

First, a text to be refined will be parsed (step 1460). A method disclosed in Japanese Patent Publication JP-A-58-40684 may, for example, be used for parsing purposes. According to this method, grammatical errors in the text can be detected. Detection and correction of grammatical errors will be omitted.

Words of a part of speech including a verb, a noun, an adjective or an adverb are extracted from the result of the parsing (step 1470). The file of text refinement rules 37 (FIG. 16) is browsed using the extracted words and phrases and their parts of speech as keywords (step 1480). If headwords corresponding to the extracted words and their parts of speech cannot be detected, the processing shifts to step 1530. If the respective words and phrases and parts of speech coincide with the contents of the headword column 96 and part of speech column 97 (step 1490), the contents of the headword column 96, part of speech column 97, preceding word column 106, following word column 107 and content column 98 corresponding to those words and phrases are displayed as comments in an overlapped manner by multi-window control in the basic display 110 where the text to be refined is displayed (step 1500). Together with this display, the corresponding words and phrases in the text, to be refined, displayed in the basic display 110 are displayed different from other portions. Under such conditions, the writer inputs data indicative of whether the appropriate portions should be corrected in accordance with the comment. If correction is required in accordance with the input (step 1510), wrong words and phrases are corrected (step 1520). If correction is unnecessary, the processing shifts to step 1530. A specific example of the method of correcting the wrong words and phrases will be described later. If the correction to the wrong words and phrases have been completed or if the extracted words and phrases cannot be detected in the file of refinement rules 37, the extracted words and phrases are replaced with the next ones (step 1530). After the update, if there are no words and phrases to be refined (step 1540), the processing ends. If the words and phrases to be refined remain, the processing returns to step 1480.

A method of correcting wrong words and phrases at step 1520 will be described. There are three such correcting methods as follows:

As a first method, when there is only one correcting (rewriting) method, the present system automatically rewrites the wrong words and phrases. <automatic rewriting is performed by (1) the replacement, insertion and removal of words, and (2) the inflection of a word by morphemic analysis. According to the line containing the headword "accept" in the file of refinement rules 37, the automatic rewriting of "accept to do" is realized by replacing "accept" with "agree" and causing the inflection of "accept" to coincide with that of "agree". In this example, a comment on "accept" is displayed also if the sentence has been generated in the form "accept +noun". The writer is able to determine that no correction is required from the contents of the display. In another way, the contents 98 of the file refinement rules 37 cannot be displayed, until the headword 96, the preceding word 106 and following word 107 coincide with the word in the text. By such operation, the content 98 will be displayed when the words in the text need to be refined, so that the operability of the present system is improved.

The second correcting method is used when there are a plurality of proposals to correction. In this case, the plurality of proposals are displayed overlapped by multiwindow control. The writer selects the possibly most appropriate proposal from those ones using the mouse.

The third correcting method is free correction by the writer. This is realized by insertion and removal of well-known characters and character strings. The third method may be used in conjunction with the first or second method. For example, correction may be effected first by the first method and then by the third method.

Figure 29:
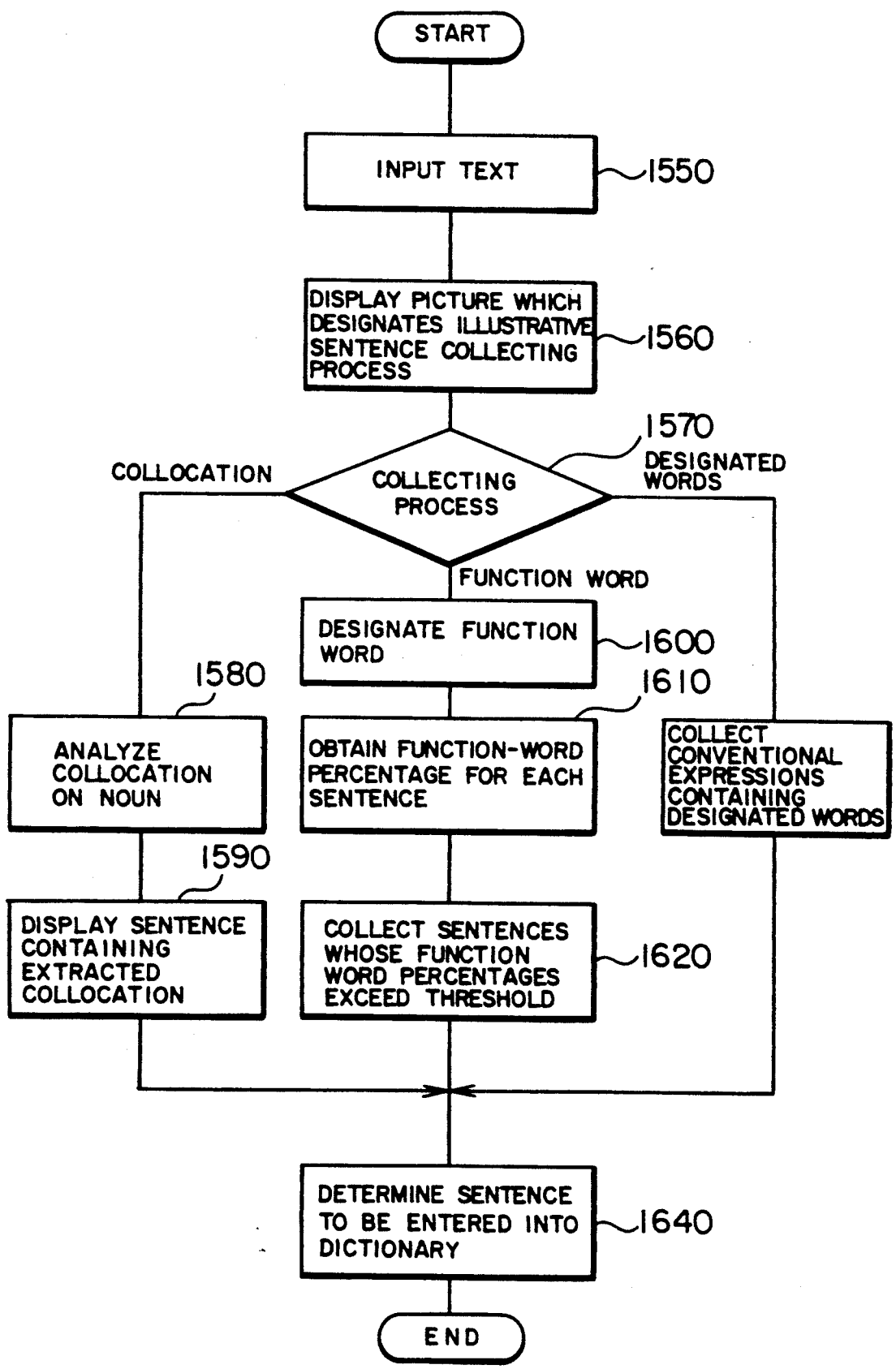
FIGS. 29 and 30 each are a flowchart indicative of a process for collection of illustrative sentences.

If the picked function is determined to collect illustrative sentences at step 11, the collection of illustrative sentences is started at step 22. The basic processing for collection of illustrative sentences will be described as the details of the processing at step 22 with reference to FIG. 29.

First, a text from which illustrative sentences are to be collected are input (step 1550). This is effected manually via the keyboard or automatic reading by an optical character reader (OCR). A text file, already generated, may be used as a text from which illustrative sentences are to be collected. The picture where the illustrative sentence collecting method is designated is displayed overlapped in the basic display 110 where the input text is displayed (step 1560). The picture 142 where the illustrative sentence collecting method is designated is shown in FIG. 36. As shown in FIG. 36, there are three such collecting methods; 1. collection concerning collocations, 2. collection concerning functional words, and 3. collection concerning designated words. The respective collecting methods are given brief comments as shown in FIG. 36. By these comments, the system is more human-friendly. The writer (who can be said to be the collector of illustrative sentences in the case of the collection of illustrative sentences) designates one of these illustrative sentence collecting methods (step 1570).

If the collection concerning collocations is designated, the analysis of collocations concerning nouns in the input text from which illustrative sentences are to be collected is executed (step 1580).

Figure 30:
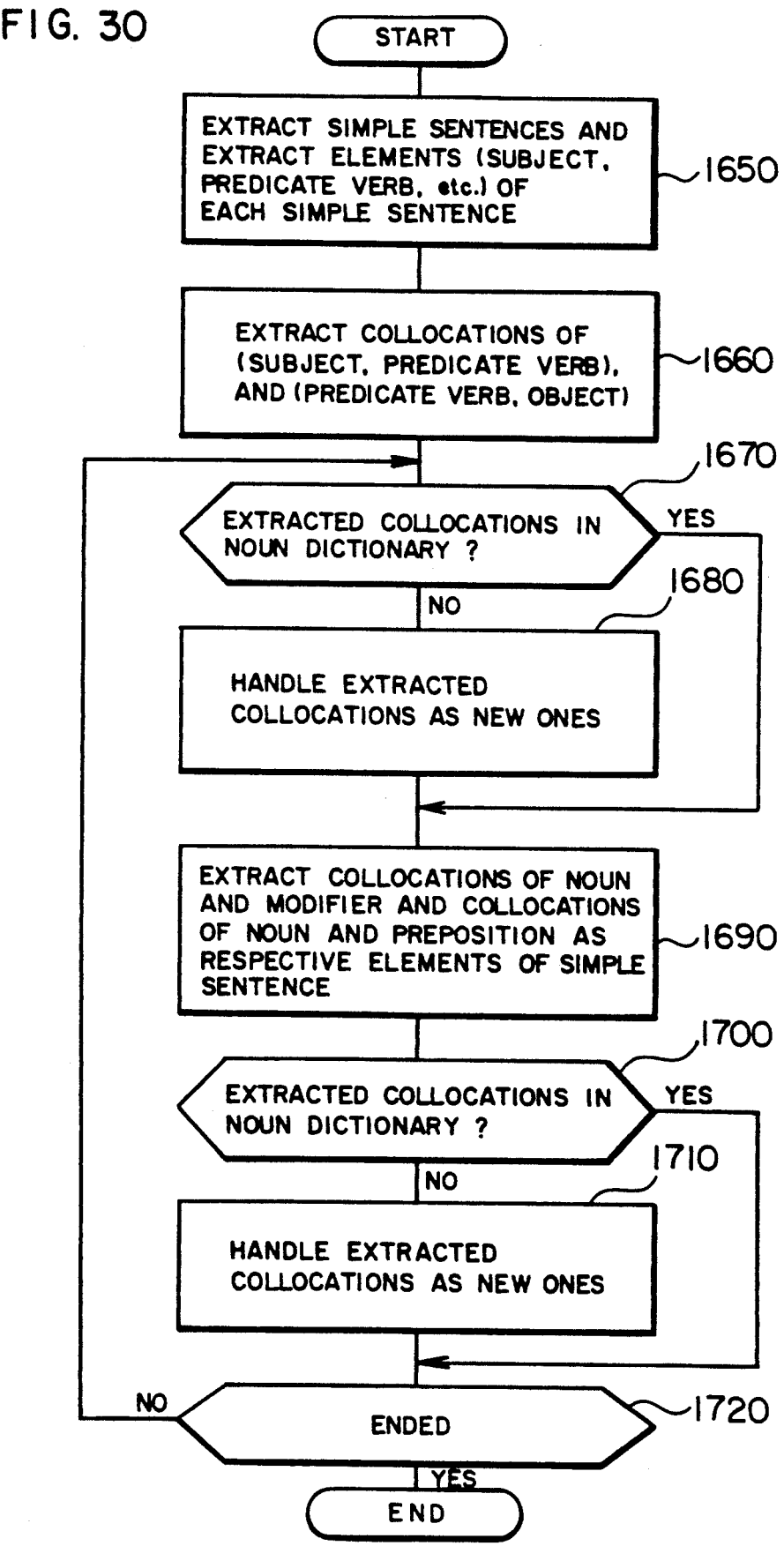

FIG. 30 illustrates the processing at step 1580 in detail. First, simple sentences and the elements of the respective simple sentences are extracted (step 1650). The elements of each simple sentence are a subject, a predicate verb, an object, a complement, and a modifier. Collocations including a subject and a predicate verb and collocations including a predicate verb and an object are extracted in accordance with the relationship between the elements of each simple sentence (step 1660). The processing at steps 1650 and 1660 may follow a method, disclosed in Japanese Patent Publication JP-A-58-40684. A specific example of the method will now be described. From the following sentence:

"Since bad teaching has shaken their confidence, they feel that they are failures at mathematics."

the following three simple sentences and sentence elements are obtained by the processing at step 1650:

(1) "<u>Bad teaching</u> <u>has shaken</u> <u>their confidence</u>."
      S            V            O (2) "<u>They</u> <u>feel</u> <u>that ... ...</u>"
     S     V       O (3) "<u>They</u> <u>are</u> <u>failures</u> <u>at mathematics.</u>;
     S     V     C         M
                      C where S is the subject, V is a predicate verb, O is the object, C is the complement and M is the modifier.

At step 1660, collocations are extracted concerning the respective simple sentences (1)–(3). The noun as the center of the subject or object is selected, which is the preprocessing for extraction of collocations from each simple sentence. In the simple sentence (1), "teaching" and "confidence" are selected. The central verb is then selected from the predicate verbs and the original of the central verb is obtained. In the simple sentence (1), "shaken" is selected and its original form "shake" is obtained. In this way, the collocation "teaching shake" including a subject and a predicate verb and the collocation "shake confidence" including a predicate verb and an object are obtained.

It is then determined whether the extracted collocations are in a noun dictionary (step 1670). The noun dictionary is a usage guiding dictionary 170 concerning noun types (FIG. 15). If the extracted collocations are already in the noun dictionary, the processing shifts to step 1690. If not, the extracted collocations are stored as new collocations in the work area 44. The example "shake confidence" is not detected in the noun dictionary 170 (FIG. 15) and stored as a new candidate for collocation entry in the work area 44.

Collocations of nouns and modifiers therefor, and collocations of nouns and prepositions as the respective elements of each sentence are extracted (step 1690). While extraction of a part of speech or a grammatical role element in units of a word has not been described, it is effected as the result of the parsing. If the simple sentence (3) of the previous example is also taken as a new example, its complement is "failures at mathematics". This complement includes "failures at" and "at mathematics" as collocations of a noun and a preposition obtained at step 1690. It is then determined whether "failures at" is present in the noun dictionary which has "failures" as its headword or whether "at mathematics" is present in the noun dictionary which has its headword "mathematics" (step 1700). If so, the processing shifts to step 1720. If not, the extracted collocation is stored in the work area 44.

It is then determined whether the above processing has been executed for all the texts, from which illustrative sentences are to be collected, input at step 1550 (step 1720). If not, the processing returns to step 1670. If so, the analysis of collocations concerning nouns is completed and the processing shifts to step 1590 where a sentence containing the extracted collocations is displayed. In this case, the extracted collocation portions are displayed different from other portions, for example, using an underline or a different color. If the same word is contained in a plurality of extracted collocations, the respective collocations are displayed different from each other such that they can be discriminated from each other.

While it is premised in the above description that the input text is correct, the extracted collocations or illustrative sentences using those collocations in a text having a probability of error may be stored in the file of text refinement rule 37. Thereafter, the processing shifts to step 1640, the processing at which will be described later.

The processing performed when the collection concerning function words is selected will be described below. First, a function word is designated (step 1600). To this end, the picture 143 of FIG. 37 is displayed overlapped in the basic display 110 which displays input texts. As will be obvious in FIG. 37, basic function words are ones of a pronoun, a preposition, a conjunction, an adverb and an auxiliary verb as a part of speech in the present system. However, the function words are changeable in part of speech as will be described later.

A method of designating a function word using a function word designating picture 143 will be described. The writer determines whether the function words are satisfied with the displayed respective parts of speech and words. If addition or deletion is required, addition 145 or deletion 146 in the picture is picked correspondingly using the mouse. For example, if the preposition "in" is to be added, the cursor should be moved after the last displayed preposition "to" and "in" should be keyed in from the keyboard. If another addition is further required, the cursor is subsequently moved to a desired position and required data should be keyed in. If required words have been input, the addition 145 should be again picked using the mouse. At this time the keyed-in words are stored in the present system.

In present system, addition of parts of speech by similar mouse operation, and character inputting are supported. An example of addition of the verb "go" will be described. The cursor is moved to a position below the name of the lowest described part of speech, "verb" is input and "go" is then input in the same line as the "verb".

Deletion is realized only by picking by the mouse. The deletion 146 is picked, all the parts of speech or words to be deleted are picked, and deletion 146 is further picked in order to delete those picked parts of speech or words. In the case of deletion of parts of speech, all the words in a line where there were parts of speech picked are deleted together.

The percentage 147 of function words in a sentence is then designated. In the present system, a predetermined percentage value is set. A new value is designated when the predetermined percentage value is to be changed. First, the percentage designation column 147 is picked using the mouse, a desired value is keyed in at the keyboard, and the designation column 147 is again picked using the mouse for inputting purposes. When the designation on the function words is completed, the function-word percentage is calculated for each of the sentences of the input text. For example, if three function words are contained in one sentence of ten words, the function-word percentage is 30%. Sentences where the function-word percentages exceed a threshold are collected and stored in the work area 144. The threshold is the function-word percentage designated in the function word designation picture 143. Subsequently, the processing shifts to step 1640, which will be described later in more detail.

One example 144 of collected illustrative sentences concerning function words is shown in FIG. 38. This illustrative sentence is obtained from the input text in accordance with the designation of function words of FIG. 37 because the function-word percentage is 31.6%, which exceeds the designated function-word percentage of 30%.

When the collection of illustrative sentences concerning designated words is designated at step 1570, the processing at step 1630 starts. In this case, a designated word is input in the designated word input column of a picture 142 where an illustrative sentence collecting process is designated. Words, idioms, etc., are input as the designated words. If a plurality of words and idioms are to be input, they are input one by one, divided with a comma (,). Any sentences in the input text which contains at least one designated word are collected and stored in the word area 44.

Collected illustrative sentences stored in the work area 44 are sequentially displayed in the basic display 110. The writer deletes unnecessary sentences from the collected illustrative sentences. The remaining or useful illustrative sentences are stored as a candidate sentence file for illustrative sentence registration in the work area 44.

Figure 31:
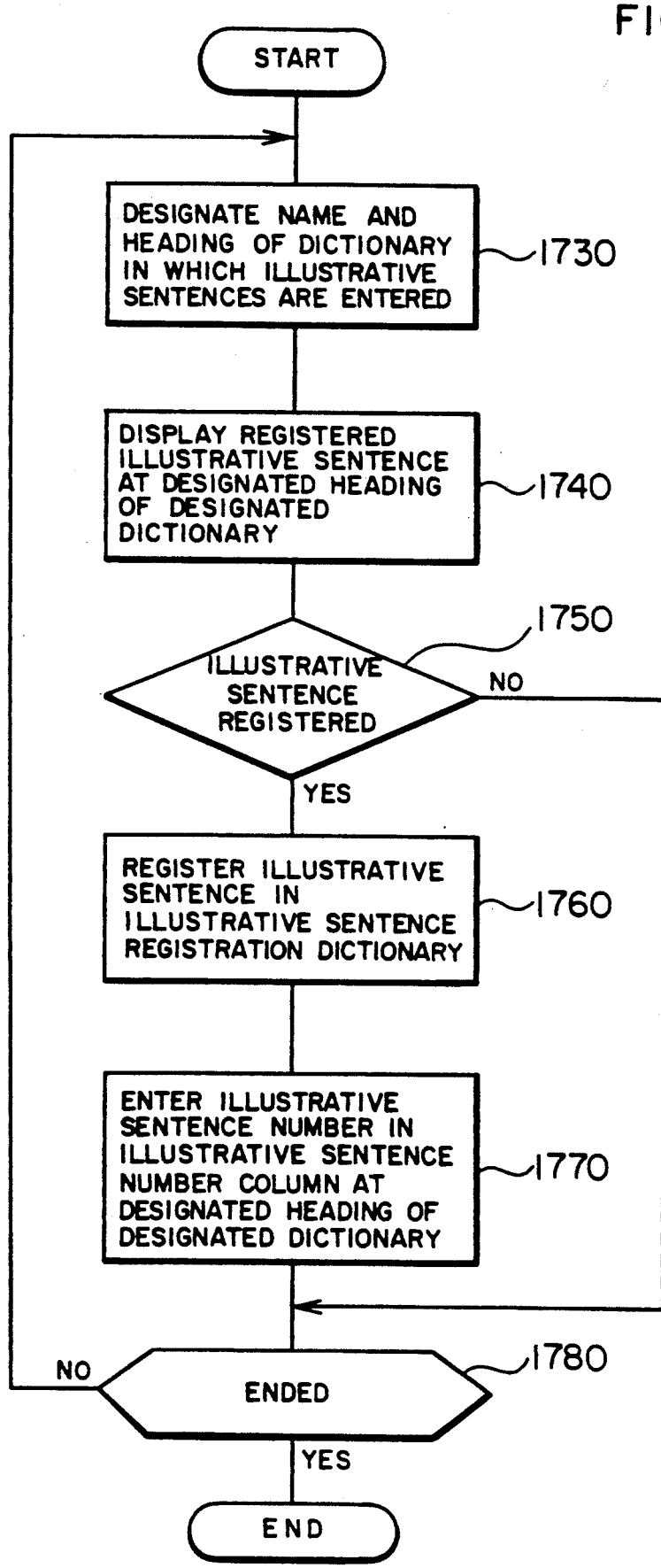
FIG. 31 is a flowchart indicative of a process for registration of illustrative sentences.

If the picked function is determined as illustrative sentence registration at step 12, the illustrative registration at step 23 starts, the details of which are shown in FIG. 31.

The contents of the candidate sentence file for illustrative sentence registration stored in the work area 44 are read out onto the basic display 110 and the name of a dictionary which registers the first illustrative sentence and the headword in the dictionary are input (step 1730). For example, in the case of the dictionary shown in FIG. 14, a collocation type dictionary as the name of the dictionary and "accept" (the dictionary number 18 may be designated instead) as the headword and the item number are input.

An illustrative sentence is read out from the illustrative sentence registration dictionary 39 by referring to the illustrative sentence number contained in the headword designated in the designated dictionary, and then displayed (step 1740). This display is performed in an overlapped manner. The writer refers to the displayed already entered illustrative sentences and determines whether the illustrative sentence as a candidate for registration should be entered or not (step 1750). If the sentence need not be entered, the processing shifts to step 1760. If the sentence should be entered, it is entered at the end of the illustrative sentence registration dictionary 39 (step 1760). At that time, the item number of the dictionary 39 is handled as the illustrative sentence number, which is then stored in the illustrative sentence number column in a predetermined line of the designated headword of the designated dictionary. Thus, one sentence as a candidate for illustrative sentence registration is completed. It is determined at step 1780 whether all the processing for candidate illustrative sentences has been completed. If not, the processing returns to step 1730 to enter the next illustrative sentence.

According to the particular embodiment, the following effects are produced:

(1) Since the generation of a text is aided consistently from the logical outline structure to the text refinement in accordance with the writer's emotion, the writer is able to generate a desired text with simple directives;

(2) Since the writer is able to always use various aiding functions during generation of a text, he or she is able to generate a desired text in a short time using those functions;

(3) Various computer aided text generation processes are remotely related to each other. Therefore, the respective generation processes may be used separately and in accordance with the respective phases of text generation, so that the human-friendly operation of the computer aided text generation system is improved as described with reference to the particular embodiment. Further, since the same aiding function is available in a recursive manner, the human-friendly operation of the system is further enhanced. For example, since guidance to the usage of a word or phrase may be used while the usage of another word or phrase is being used, the particular embodiment is very advantageous when the best result should be obtained from a plurality of related pieces of information;

(4) The various computer aided text generation processes are related remotely to each other. That is, the respective functions are little dependent on another function, not limited to a system which consistently aids the process from the logical outline structure to refinement of a text, and exhibit the respective functions separately. Therefore, the present invention is not limited to the particular embodiment mentioned above and the respective functions of the inventive system may be applicable individually to other computer aided text generation systems and/or word processors;

(5) The type of a text to be generated and the writer's intention (nuance) to the text are set and a logical outline structure in which the components are items (scenes, topics) constituting the text is determined in accordance with that setting. Therefore, the writer can easily select a logical outline structure satisfying his or her intention to thereby facilitate the generation of a text which reflects thereon the writer's intention and emphasis;

(6) Appropriate conventional expressions corresponding to a scene and a topic following a logical outline structure satisfying the writer's intention are displayed automatically. A conventional expression can be selected and corrected at simple directives responsive to that display to thereby facilitate the generation of a text.

When a logical outline structure is designated, appropriate conventional expressions following that logical outline structure are generated automatically. A conventional expression is selected and corrected in response to simple directives to the generated conventional expression. Appropriate conventional expressions are successively generated automatically in accordance with the logical outline structure designated by simple directives. In order to reflect the writer's intention appropriately, a style, an expression of the writer's emotion and the length of a text to be generated can be set as attributes to the text. As just described above, the writer can easily generate a desired, especially nuanced text with simple directives. If a convention expression is to be changed, its wording can be corrected, so that the degree of option of text generation is high.

(7) A syntax dictionary is provided where various expressions of the same contents correspond. Thus, when a desired syntax is retrieved from the dictionary in accordance with guidance to the syntax by referring the dictionary, the precision rate in retrieval is improved and hence the writer is allowed to get an appropriate expression. The generation of a text of appropriate expressions can be aided by guidance to the usage which tells the writer the usage of words, collocations, idioms, etc., which are the components of a sentence or their parts of speech.

(8) A generated text can be refined further by realization of a refining function which checks the coincidence of words and phrases constituting a text to its context and the appropriateness of the text as a natural word. A refined text can be generated in a short time by aiding the generation of a conventional expression having a format determined beforehand to some extent and aiding the refinement of the expression.

(9) By the realization of various illustrative-sentence collecting functions, dictionaries and rules such as a collection of rules which the computer aided text generation system has are multiplied advantageously. That is, the acquisition of knowledge is realized by the system. The function of aiding the collection of illustrative sentences is not only directed to generated texts, but also can collect illustrative sentences from a text such as a novel or a paper read by an optical character reader or from a collection of illustrative sentences as a book when occasion demands.

The illustrative sentences thus collected are available as the conventional expressions as mentioned above, guidance and usage guidance. They are also available as the illustrative sentences for syntax guidance and usage guidance. Thus, by the realization of the illustrative sentence collecting function, dictionaries and rules such as a collection of rules which the system has are multiplied advantageously. Thus, the acquisition of knowledge by the system is realized by the present invention.

(10) While in the description and drawings of the particular embodiment the computer aided text generation methods and systems are mainly handled, the present invention may, of course, be applicable to mechanical translation methods and systems and further to word processors advantageously, as will be obvious from description and drawings of the embodiment.

(11) In addition to the effects mentioned above, many other effects are produced by the present invention as will be obvious from the description and drawings of the particular embodiment.

According to the present invention, the writer's intention (nuance) is reflected in a text to be generated, so that the generation of a desired text is aided. By using a text refinement aiding function, a generated text is refined and a text of higher quality is produced. Thus, a computer aided text generation system is constructed in which the use of the illustrative sentence collecting function serves to provide plentiful illustrative sentences when text generation is aided.

What is claimed is:

1. A computer system which includes a central processing unit, a memory, an input device and an output device, said memory storing a file of commonly used expressions and a rule for use in determining a logical outline structure of a text from first data representing classification of the text and second data representing nuance of the text, a computer aided text generation method comprising:

(a) a first step of inputting the first data of the text by said input device;

(b) a second step of inputting the second data of the text by said input device;

(c) a third step of obtaining a logical outline structure of the text corresponding to said input first and second data by referring to said rule stored in said memory;

(d) a fourth step of graphically outputting said logical outline structure obtained by said third step to said output device;

(e) a fifth step of inputting third data designating at least a scene and a topic contained in said output logical outline structure from said input device in correspondence to the output logical outline structure; and (f) a sixth step of selecting a commonly used expression corresponding to said second data representing nuance of the text from said file of commonly used expressions in response to said inputted third data designating at least a scene and a topic contained in said output logical outline structure.

2. A computer aided text generation method according to claim 1, further comprising a step of repeating said fourth to sixth steps for each of a plurality of paragraphs of the text.

3. A computer aided text generation method using a computer system which comprises a central processing unit, a memory, an input device and an output device, comprising:

(a) a first step of setting a type of a text;

(b) a second step of setting nuance of the text;

(c) a third step of obtaining a logical outline structure diagram indicative of the logical outline structure of the text following the step type and nuance of the text by referring to a rule stored in said memory;

(d) a fourth step of outputting the logical outline structure diagram to said output device obtained by said third step;

(e) a fifth step of selecting an element indicative of the contents of the text from the output logical outline structure diagram;

(f) a sixth step of selecting a commonly used expression from a file of commonly used expressions provided in said memory in response to said selected element;

(g) a seventh step of outputting said selected commonly used expression to said output device;

(h) an eighth step of accepting a request for correcting the output commonly used expression;

(i) a ninth step of correcting the selected commonly used expression in response to contents to be corrected corresponding to said accepted request;

(j) a tenth step of determining whether there is an error in the commonly used expression corrected by said ninth step of referring to said rule provided in the memory;

(k) an eleventh step of outputting, when there is an error as a result of the determination, to said output device a comment on the error;

(l) a twelfth step of accepting a request for further correcting the corrected commonly used expression in response to said comment from said output device; and (m) a thirteenth step of further correcting the corrected commonly used expression in response to contents to be corrected corresponding to the correcting request in said twelfth step.

4. A computer aided text generation method comprising:
(a) a first step of setting first data representing classification of a text;
(b) a second step of setting second data representing nuance of the text;
(c) a third step of obtaining a logical outline structure of the text corresponding to said input first and second data by referring to said rule stored in said memory;
(d) a fourth step of graphically outputting said logical outline structure obtained by said third step to said output device;
(e) a fifth step of inputting third data designating at least a scene and a topic contained in said output logical outline structure form said input device in correspondence to the output logical outline structure; and
(f) a sixth step of selecting a commonly used expression corresponding to said second data representing nuance of the text from said file of commonly used expressions in response to said inputted third data designating at least a scene and a topic contained in said output logical outline structure.

5. A computer aided text generation method according to claim 4, wherein said third step includes:
a step of determining the logical outline structure of the text for each of a plurality of paragraphs of the text.

6. A computer aided text generation method comprising:
(a) a first step of setting first data on a text;
(b) a second step of setting second data on the text; and
(c) a third step of determining a logical outline structure of the text corresponding to the set first and second data by referring to a rule to determine the logical outline;
wherein said first data on the text includes a text classification, which is divided into hierarchies, each having a text classification table, said first step including:
a step of sequentially browsing the text classification tables for the hierarchies, starting from the uppermost table in the hierarchies; and
a step of obtaining a text classification stored in the lowermost table of the hierarchical text classification tables.

7. A computer aided text generation method according to claim 6, wherein said step of browsing the hierarchical text classification tables sequentially repeats, starting from the uppermost table of the hierarchical text classification tables;
a step of outputting to an output device the contents of the respective text classification table; and
a step of inputting one text classification in the output text classification table from an input device.

8. A computer aided text generation method comprising:
(a) a first step of setting first data on a text;
(b) a second step of setting second data on the text; and
(c) a third step of determining a logical outline structure of the text corresponding to the set first and second data by referring to a rule to determine the logical outline structure of text;
wherein said second step includes:
a step of setting, as the second data of the text, at least one of a style and a length of the text and degree of emphasis.

9. A computer aided text generation method according to claim 8, further including:
a step of outputting to an output device information stepwise indicative of the degrees of items indicated by the second data of the text; and
a step of selecting one piece of information from the output information.

10. A computer aided text generation method comprising:
(a) a first step of setting first data on a text;
(b) a second step of setting second data on the text; and
(c) a third step of determining a logical outline structure of the text corresponding to the set first and second data by referring to a rule to determine the logical outline;
wherein a two-dimensional table is provided, the first dimension of the table corresponding to the first data of the text, the second dimension of the table corresponding to the second data of the text, the classification of a logical outline structure being set at a position where the first and second dimensions intersect, said third step comprising:
a step of browsing the first dimension with the first data on the set text;
a step of browsing the second dimension with the second data on the set text; and
a step of obtaining the classification of a logical outline structure at a position in the two-dimensional table indicated by the results of browsing the first and second dimensions.

11. A computer aided text generation method comprising:
(a) a first step of setting first data on a text;
(b) a second step of setting second data on the text; and
(c) a third step of determining a logical outline structure of the text corresponding to the set first and second data by referring to a rule to determine the logical outline;
further including:
a step of providing a logical outline structure diagram file indicative diagrammatically of a logical outline structure of the text;
a fourth step of obtaining from said logical outline structure diagram file a logical outline structure diagram corresponding to the logical outline structure determined in the third step; and
a fifth step of indicating said logical outline structure diagram in a graphical manner.

12. A computer aided text generation method according to claim 11, wherein
said logical outline structure diagram is indicative of first information on the text and a relationship among the first information.

13. A computer aided text generation method according to claim 12, wherein said first information on the text includes second information on the text and third information on a text containing details of the second information.

14. A computer aided text generation method according to claim 13, wherein said first information on the text includes elements indicative of the contents of the text, wherein said second information on the text includes a scene developed in the text, and wherein said third information includes a topic related to the scene developed in the text.

15. A computer aided text generation method according to claim 13, further including:
- a sixth step of selecting from said second information a desired one to be described in the text;
- a seventh step of selecting from said third information a desired one to be described in the text in correspondence to the selected second information when occasion demands;
- an eighth step of displaying the selected second and third data in a visually distinguishable manner different from that used for display of the second or third information which has not been selected in said seventh step.

16. A computer aided text generation method according to claim 15, further including:
- a ninth step of setting, when a plurality of pieces of second information are selected, a logical outline structure of a text on the selected plurality of pieces of second information in the sequence of selecting said plurality of pieces of second information; and
- a tenth step of setting, when a plurality of pieces of third information are selected corresponding to one piece of the selected plurality of pieces of second information, the logical outline structure of the text, on the selected plurality of pieces of third information in the logical outline structure of the text on the second information, in the sequence of selecting the plurality of pieces of third information.

17. A computer aided text generation method, using a computer system which comprises a memory storing a file of commonly used expressions, comprising:
- (a) a first step of setting elements indicative of the contents of a text; and
- (b) a second step of selecting a commonly used expression from said file of commonly used expressions in response to said elements set in said first step;
- wherein when a plurality of commonly used expressions are used in correspondence to one of elements indicative of the contents of the text, information indicative of a sequence of using the plurality of commonly used expressions is stored in said file of commonly used expressions in correspondence to each of said plurality of the commonly used expressions, the method further including:
- a third step of aligning, when said plurality of commonly used expressions are selected in the second step, the selected plurality of commonly used expressions by referring to said information indicative of sequence of using the selected plurality of commonly used expressions.

18. A computer aided text generation method according to claim 17, further including
- a fourth step of outputting said selected commonly used expression to an output device.

19. A computer aided text generation method according to claim 17, further including:
- a first step of selecting, when there is no commonly used expressions in said file of commonly used expressions corresponding to one of elements indicative of the contents of the text, a commonly used expression from said file of commonly used expressions in response to an element indicative of contents close to those indicated by the one element.

20. A computer aided text generation method, using a computer system which comprises a central processing unit, a memory, an input device and an output device, said memory including a file of commonly used expressions, information on correctable portions of the commonly used expressions of the file and comments on the correctable portions, comprising:
- (a) a first step of setting first information on a text;
- (b) a second step of selecting a commonly used expression from the file of commonly used expressions in response to said first information;
- (c) a third step of outputting the selected commonly used expression to said output device;
- (d) a fourth step of determining whether correction to the output commonly used expression is required or not;
- (e) a fifth step of outputting to said output device a comment corresponding to a correctable portion of the output commonly sued expression when correction is required as a result of the determination; and
- (f) a sixth step of correcting the commonly used expression output to said output device in response to the comment.

21. A computer aided text generation method according to claim 20, wherein said third step includes:
- a step of outputting information on a correctable portion, corresponding to the selected commonly used expression, in a visually distinguishable manner different from that used for outputting information on other than the correctable portions by referring to the information on the correctable portion.

22. A computer aided text generation method according to claim 21, including:
- a step of outputting, when there are a plurality of such correctable portions outputted in the visually distinguishable manner and including overlapping portions, information on the overlapping portions in a further visually distinguishable manner.

23. A computer aided text generation method according to claim 20, wherein the file of commonly used expressions includes a commonly used expression where the correctable portions include a blank, said third step including:
- a step of outputting, when the commonly used expression having the blank is selected, the blank of the selected commonly used expression in a visually distinguishable manner different from that used to output other than the blank by referring to information on the correctable portions.

24. A computer aided text generation method using a computer system which comprises a memory which stores a first dictionary where an expression of a string of words is stored in correspondence to a keyword which includes a first word determined in the expression of the string of words, and a table where a second predetermined word is stored, comprising:
- (a) a first step of deleting the same word as that stored in said table from a string of words constituting an expression to be retrieved;
- (b) a second step of browsing said first dictionary using the remaining words as a keyword as a result of the deletion;
- (c) a third step of obtaining, when the keyword is detected using the remaining words as a result of the browsing, from said first dictionary an expression corresponding to the keyword; and (d) a fourth step of using the expression obtained for said first dictionary as the expression to be retrieved;

wherein a second dictionary is provided which stores expressions, different from those in said first dictionary, in correspondence to a keyword which comprises a second word determined in the expressions different from those in said first dictionary, said second dictionary storing information, indicative of expressions in the first dictionary similar in contents to the respective expressions in said second dictionary, in correspondence to the respective expressions in said second dictionary, further comprising:

a fifth step of browsing said second dictionary using the remaining words as the keyword when the keyword cannot be detected using the remaining words as a result of the browsing of said first dictionary; and a sixth step of obtaining, when the keyword has been detected using the remaining words as a result of the browsing, an expression corresponding to that to be retrieved from said first dictionary by referring to information indicative of an expression in said first dictionary corresponding to that which in turn corresponds to the detected keyword.

25. A computer aided text generation method, using a computer system which comprises a central processing unit, a memory, an input device and an output device, wherein said memory stores as rules a method of describing items in a predetermined format portion of a text in correspondence to the items, comprising:

(a) a first step of outputting to said output device information on description guidance for each of the described items;

(b) a second step of inputting from said input device to said system information on the contents to be described for each of the described items;

(c) a third step of checking the input contents by referring to the rules;

(d) a fourth step of outputting to said output device information on the describing method corresponding to an error, if any, in the input contents as a result of the checking;

(e) a fifth step of inputting from said input device to said system information on corrected contents;

(f) a sixth step of correcting the input contents in response to the corrected contents; and (g) a seventh step of converting the input contents to a predetermined format of the text.

26. A computer aided text generation method according to claim 25, wherein the fourth step includes:

a step of indicating the input contents involving an error in a visually distinguishable manner different from that used for indicating other than the contents involving an error.

27. A computer aided text generation method according to claim 25, wherein the input contents expected in the described item are stored in said memory in correspondence to the described item, and wherein said third step comprises:

a step of checking the input contents by referring to the expected input contents.

28. A computer aided text generation method according to claim 27, further including:

a step of checking the input contents by using as a don't care at least one character of string of characters constituting the expected input contents.

29. A computer aided text generation method wherein a rule includes information of usage of a plurality of predetermined words and a comment on said usage of said predetermined words, comprising:

(a) a first step of parsing a text in order to correct an error included in the text;

(b) a second step of obtaining information of a predetermined part of speech and a plurality of words having said predetermined part of speech from a result of the parsing;

(c) a third step of checking said words having said predetermined part of speech with said predetermined words in said rule;

(d) a fourth step of displaying said predetermined words in said rule together with said comment on said usage of said predetermined words when coincidence is detected as a result of the checking; and (e) a fifth step of correcting the text, in response to said comment;

wherein said fourth step comprises:

a step of displaying words, of the text, corresponding to the predetermined words in the rule, in a visually distinguishable manner different from that used for displaying other than those words of the text.

30. A computer aided text generation method information of usage of a plurality of predetermined words and a comment on said usage of said predetermined words, comprising:

(a) a first step of parsing a text in order to correct an error included in the text;

(b) a second step of obtaining information of a predetermined part of speech and a plurality of words having said predetermined part of speech from a result of the parsing;

(c) a third step of checking said words having said predetermined part of speech with said predetermined words in said rule;

(d) a fourth step of displaying said predetermined words in said rule together with said comment on said usage of said predetermined words when coincidence is detected as a result of the checking; and (e) a fifth step of correcting the text, in response to said comment further including:

a step of handling the predetermined words in the rule as ones the usage of which is mistakable.

31. A computer aided text generation method according to claim 30, wherein when there is one method of correcting of mistakable words, said one method of correcting is included in the comment, and wherein said fifth step includes:

a step of correcting the text to be refined, in accordance with said one correcting method.

32. A computer aided text generation method according to claim 30, wherein when there is a plurality of methods of correcting mistakable words, those methods of correcting are included in the comment, and wherein said fifth step includes:

a step of selecting one of said plurality of correcting methods to thereby correct the text to be refined.

33. A computer aided text generation method, using a computer system which comprises a central processing unit, a memory, an input device and an output device to generate a text, using illustrative sentences, comprising:

(a) a first step of inputting to said system a text from which illustrative sentences are to be collected;

(b) a second step of outputting to said output device information on guidance to a method of collecting an illustrative sentence;

(c) a third step of inputting to said system information on the collection of the illustrative sentence in correspondence to the output information; and (d) a fourth step of collecting illustrative sentences from the text in accordance with said input information on collection of the illustrative sentence.

34. A computer aided text generation method according to claim 33, wherein said information on the guidance to a method of collecting an illustrative sentence includes information on a method of collecting a plurality of illustrative sentences, and wherein said third step comprises:

a step of inputting to said system information on at least one method of collecting an illustrative sentence from said information on the method of collecting a plurality of illustrative sentences.

35. A computer aided text generation method according to claim 34, wherein said third step includes:

a step of selecting at least one method of collecting illustrative sentences from a method of collecting illustrative sentences directed to collocations, a method of collecting illustrative sentences directed to function words and a method of collecting illustrative sentences directed to designated words.

36. A computer aided text generation method according to claim 35, wherein when the method of collecting illustrative sentences directed to collocations is selected, said fourth step comprises:

a step of extracting a simple sentence from the text from which illustrative sentences are to be collected;

a step of extracting elements of the simple sentence from said simple sentence;

a step of extracting a collocation from the relation among said elements of the simple sentence; and a step of collecting as an illustrative sentence the simple sentence containing the extracted collocation.

37. A computer aided text generation method according to claim 35, wherein when said method of collecting illustrative sentences directed to the function words is selected, said fourth step comprises:

a step of outputting information on designation of a function word;

a step of designating the function word in response to the information on designation of the function word;

a step of designating the percentage of the designated function word contained in a sentence to be collected as an illustrative sentence; and a step of collecting as an illustrative sentence a sentence containing the designated function word in a percentage larger than the designated one in each of the sentences of the text from which illustrative sentences are to be collected.

38. A computer aided text generation method according to claim 37, wherein said information on the designation of the function word includes that on a predetermined part of speech and at least one word or phrase contained in the part of speech, and wherein said step of designating the function word comprises:

a step of adding and performing at least one of deleting a displayed part of speech a word or a phrase.

39. A computer aided text generation method according to claim 35, wherein the method of collecting illustrative sentences directed to the function word is selected, said fourth step comprises:

a step of collecting as an illustrative sentence a sentence which includes at least one designated word in each of the sentences of the text to be collected.

40. A computer aided text generation method, using a computer system which comprises a central processing unit, a memory, an input device and an output device to generate a text using illustrative sentences, comprising:

(a) a first step of inputting to said system another text other than said text from which illustrative sentences are to be collected;

(b) a second step of outputting to said output device information on guidance to a method of collecting an illustrative sentence;

(c) a third step of inputting to said system, information on collection of the illustrative sentence in correspondence to the output information;

(d) a fourth step of collecting the illustrative sentence from the another text in accordance with the information on collection of the illustrative sentence;

(e) a fifth step of outputting to said output device, information on the collected illustrative sentence obtained in said fourth step;

(f) a sixth step of accepting the designation of a file, wherein the illustrative sentence is to be stored, in correspondence to the collected illustrative sentence outputted to said output device; and (g) a seventh step of storing the collected illustrative sentence in the designated file.

41. A computer aided text generation system comprising:

(a) a memory storing a rule for use in determining a logical outline structure of a text from first data representing classification of said text and second data representing nuance of the text and a file of commonly used expressions;

(b) an input device for inputting to said system first data and second data of the text;

(c) an output device; and (d) a central processing unit connected to said memory, said input device and said output device, said central processing unit obtains a logical outline structure diagram indicative of the logical output structure of the text corresponding to said input first and second data of the text by referring to said rule, graphically outputs information of said logical outline structure diagram to said output device, inputs, from said input device to said system, third data designating at least a scene and a topic contained in said output logical outline structure in correspondence to said output information of the logical outline structure diagram, and selects a commonly used expression corresponding to said second data representing nuance of said text from said file of commonly used expressions in response to said inputted third data designating at least a scene and a topic contained in said output logical outline structure.

42. A computer aided text generation system comprising:

(a) a memory storing a rule to determine a logical outline structure of a text from the classification and nuance of the text, a file of commonly used expressions and a text defining rule;

(b) an input device for inputting to said system classification and nuance of the text;

(c) an output device; and (d) a central processing unit connected to said memory, said input device and said output device, said central processing unit obtains a logical outline structure diagram of the text following the classification and nuance of the text by referring to a rule provided in said memory, outputs information of the logical outline structure diagram to said output device, selects an element indicative of the contents of the text from the output information of the logical outline structure diagram, selects a commonly used expression from said file of illustrative sentences in response to said input element, outputs the selected commonly used expression to said output device, inputs from said input device to said system a request for correcting the output commonly used expression, corrects the selected commonly used expression in response to corrected contents corresponding to a request for correcting, determines whether the corrected commonly used expression involves an error by referring to said text refining rule stored in said memory, outputs, if a result of the determination indicates the presence of an error, to the output device a comment corresponding to the error, inputs from said input device to said system a request for further correcting the corrected commonly used expression in response to said comment, and further corrects the corrected commonly used expression in response to corrected contents corresponding to said request for correcting.

43. A computer aided text generation system comprising:

a memory storing a rule for use in determining a logical outline structure of a text from first data representing classification of said text and second data representing nuance of said text and a logical outline structure diagram file to display the logical outline structure diagram;

(b) first means for setting said first data of said text;

(c) second means for setting said second data of said text;

(d) third means responsive to an output from said first and second means for determining a logical outline structure of the text by referring to said rule stored in said memory;

(e) fourth means responsive to the output of said third means for obtaining a logical outline structure diagram from said logical outline structure diagram file stored in said memory;

(f) fifth means for graphically displaying the logical outline structure diagram;

(g) sixth means for inputting third data designating at least a scene and a topic contained in said output logical outline structure from said fourth means in correspondence to the output logical outline structure; and (h) seventh means for selecting a commonly used expression corresponding to said second data representing nuance of the text from a file of commonly used expressions in response to said inputted third data designating at least a scene and a topic contained in said output logical outline structure.

44. A computer aided text generation system comprising:

(a) a memory storing a file of commonly used expressions, information on correctable portions of the respective commonly used expression of the file and comments on the correctable portions;

(b) first means for setting information on a text;

(c) second means responsive to the output of said first means for selecting a commonly used expression from the file of commonly used expressions;

(d) third means for determining whether correction to the commonly used expression selected by said second means is required or not;

(e) an output device for outputting the commonly used expression selected by said second means and a comment corresponding to a correctable portion of the output commonly used expression when a result of the determination by said third means requires correction; and (f) an input device responsive to said comment from said output means for inputting to said system, corrected contents of the commonly used expression selected by said second means.

45. A computer aided text generation system comprising:

(a) a memory storing as a rule, a method of describing items in a predetermined format portion in a text in correspondence to the items;

(b) an output device for outputting information on description guidance for each of the described items;

(c) an input device for inputting to said system, contents to be described corrected for each of the described items;

(d) first means for checking the described contents by referring to said rule;

(e) second means for outputting, when the output of said first means indicates an error involved in the described contents, a relevant one among said rule corresponding to the error to said output device;

(f) third means responsive to said corrected contents for correcting said described contents; and (g) fourth means for converting said input contents to a predetermined format of the text.

46. A computer aided text generation system comprising:

(a) an output device for outputting information a guidance to a method or collecting illustrative sentences to be used for text generation;

(b) an input device for inputting to said system, a text from which illustrative sentences are to be collected and information necessary for collecting illustrative sentences in correspondence to output information from said output device; and (c) means responsive to input information necessary for collecting illustrative sentences from said input device, for collecting illustrative sentences from the text.

47. A computer aided text generation system comprising:

(a) a memory storing a file which in turn stores illustrative sentences;

(b) an output device for outputting an illustrative sentence and information on guidance to a method of collecting illustrative sentences to be used for text generation;

(c) an input device for inputting to said system (1) a text from which illustrative sentences are to be collected, (2) information necessary for collecting illustrative sentences in correspondence to output information from said output device and (3) information on designation of the file in said memory for storing illustrative sentences;

(d) means responsive to input information necessary for collecting illustrative sentences from said input device, for collecting from the text from which illustrative sentences are to be collected illustrative sentences; and (e) means for storing the illustrative sentences collected by said collecting means in a designated location of said file.

48. A word processor apparatus comprising:
a central processing unit connected to a memory, an input device and an output device;
said central processing unit executes at least two of a logical outline structure program for determining a logical outline structure of a text, a commonly used expression selecting program for selecting a commonly used expression corresponding to the logical outline structure, a commonly used expression correcting program for correcting the selected commonly used expression, a syntax guiding program for indicting a syntax necessary for generating a text, a usage guiding program for indicating usage necessary for generating a text, a text refinement program for refining the generated text, and an illustrative sentence collecting program for collecting illustrative sentences used for generating a text, said programs being stored in said memory, wherein when said central processing unit is executing one of said programs, said central processing unit is capable of executing another program during execution of said one program.

49. In a system including a central processing unit, a memory, an input device and an output device, wherein said memory stores a rule for use in determining a logical outline structure of a text of a first language from first data representing classification of said text and second data representing nuance of said text, and a file of commonly used expressions in said first language,
a machine translation method of translating a second language to the first language comprising:

(a) a first step of inputting from said input device to said central processing unit, first data of the text to the second language;

(b) a second step of inputting from said input device to said central processing unit second data of the text in the second language;

(c) a third step of obtaining a logical outline structure of the text in the second language corresponding to said input first and second data referring to said rule stored in said memory;

(d) a fourth step of graphically outputting information on said logical outline structure to said output device;

(e) a fifth step of inputting from said input device to said central processing unit, third data designating at least a scene and a topic contained in said output logical outline structure in the second language in correspondence to the output information on the logical outline structure; and (f) a sixth step of selecting a commonly used expression of the first language corresponding to said second data representing nuance of said text from said file of commonly used expressions in response to the third data designating at least a scene and a topic inputted in said fifth step.

50. A machine translation method of translating a second language to a first language, using a computer system which comprises a central processing unit, a memory, an input device and an output device, wherein said memory stores a file of commonly used expressions in the first language, information on correctable portions of commonly used expressions in the file, and a comment in the second language on the correctable portions, comprising:

(a) a first step of setting first information on a text in the second language;

(b) a second step of selecting a commonly used expression in the first language from said file of commonly used expressions in response to the first information set in said first step;

(c) a third step of outputting the conventional expression selected in said second step to said output device;

(d) a fourth step of determining whether correction to the output commonly used expression is required or not;

(e) a fifth step of outputting to said output device a comment corresponding to a correctable portion of the output commonly used expression when correction is required as a result of the determination by said fourth step; and (f) a sixth step of correcting, in response to said comment, the commonly used expression outputted to said output device in the first or second language.

51. A machine translation method of translating a second language to a first language, using a computer system which comprises a central processing unit, a memory, an input device and an output device, wherein said memory stores as a rule, a method of describing an item in a predetermined format portion in a text in the first language in correspondence to that item, comprising:

(a) a first step of outputting to said output device, information on description guidance for each of the described items in the first or second language;

(b) a second step of inputting from said input device to said system the contents described for each of the described items in the first or second language;

(c) a third step of checking the input contents by referring to said rule;

(d) a fourth step of outputting, when an error is detected in the input contents as a result of the checking in said third step, to said output device the method of describing corresponding to the error in the input contents in the first or second language;

(e) a fifth step of inputting corrected contents for the error in the first or second language from said input device to said system;

(f) a sixth step of correcting the input contents in response to the corrected contents; and (g) a seventh step of converting the input contents to a predetermined format in the text of the first language.

52. A method of collecting illustrative sentences, using a computer system which comprises a central processing unit, a memory, an input device and an output device, comprising:

(a) a first step of inputting information on a text from which illustrative sentences are to be collected;

(b) a second step of outputting to said output device, information on guidance to the method of collecting illustrative sentences;

(c) a third step of inputting information on collection of illustrative sentences in correspondence to the output information; and (d) a fourth step of collecting an illustrative sentence from the text, from which illustrative sentences are to be collected, in accordance with the input information on collection of the illustrative sentences from said first step.

53. A method of collecting illustrative sentences, using a computer system which comprises a central processing unit, a memory, an input device and an output device, comprising:
   (a) a first step of inputting to said input device, information on a text from which illustrative sentences are to be collected;
   (b) a second step of outputting to said output device, information on guidance to the method of collecting illustrative sentences;
   (c) a third step of inputting to said input device, information on collection of illustrative sentences in correspondence to the output information;
   (d) a fourth step of collecting an illustrative sentence from said text, from which illustrative sentences are to be collected, in accordance with the input information on collection of illustrative sentences from said first step;
   (e) a fifth step of outputting information on the collected illustrative sentence to said output device;
   (f) a sixth step of accepting designation of a file which stores information on the output illustrative sentence in correspondence to that illustrative sentence; and
   (g) a seventh step of storing information on the collected illustrative sentences in said designated file.

* * * * *